(12) United States Patent
Villalpando et al.

(10) Patent No.: US 12,210,220 B2
(45) Date of Patent: Jan. 28, 2025

(54) HARDWARE ARCHITECTURE FOR MODULARIZED EYEWEAR SYSTEMS, APPARATUSES, AND METHODS

(71) Applicant: SOLOS TECHNOLOGY LIMITED, Hong Kong (HK)

(72) Inventors: Ernesto Carlos Martinez Villalpando, Shrewsbury, MA (US); Chiu Ming So, Hong Kong (HK); Kwok Wah Law, Hong Kong (HK); Wai Kuen Cheung, Hong Kong (HK)

(73) Assignee: Solos Technology Limited, Hong Kong (HK)

( * ) Notice: Subject to any disclaimer, the term of this patent is extended or adjusted under 35 U.S.C. 154(b) by 0 days.

(21) Appl. No.: 18/209,418

(22) Filed: Jun. 13, 2023

(65) Prior Publication Data

US 2023/0324709 A1   Oct. 12, 2023

Related U.S. Application Data

(63) Continuation of application No. 16/926,722, filed on Jul. 12, 2020, now Pat. No. 11,709,376, which is a
(Continued)

(51) Int. Cl.
*G02C 5/00* (2006.01)
*G02B 27/01* (2006.01)
(Continued)

(52) U.S. Cl.
CPC ......... *G02C 5/001* (2013.01); *G02B 27/0172* (2013.01); *G02B 27/0176* (2013.01);
(Continued)

(58) Field of Classification Search
CPC ........ G02C 5/001; G02C 5/146; G02C 11/10; G02C 2200/02; G02C 2200/08;
(Continued)

(56) References Cited

U.S. PATENT DOCUMENTS 11,237,409 B2 * 2/2022 Lore .................. G02B 27/0093
2007/0030442 A1   2/2007 Howell et al.
(Continued)

*Primary Examiner* — William R Alexander
(74) *Attorney, Agent, or Firm* — Caldwell Intellectual Property Law

(57) ABSTRACT

Systems, apparatuses, and methods are taught that provide reconfigurable components for eyewear devices. A reconfigurable component for use in an eyewear device includes an embedded electronics system. The embedded electronics system is configured for wireless communication and for processing sensor signals. The embedded electronics system is embedded into a component of the eyewear device. A plurality of sensors is embedded into one or more of the reconfigurable component and the eyewear device. The plurality is in electrical communication with the embedded electronics system. The embedded electronic system further includes a processor. The processor is configured to receive outputs from the plurality of sensors and to determine a system control parameter from an output of at least one sensor of the plurality of sensors.

18 Claims, 25 Drawing Sheets

Related U.S. Application Data continuation of application No. 16/711,340, filed on Dec. 11, 2019, now Pat. No. 11,796,833.

(60) Provisional application No. 62/873,889, filed on Jul. 13, 2019, provisional application No. 62/778,709, filed on Dec. 12, 2018.

(51) Int. Cl.
  *G02C 5/14* (2006.01)
  *G02C 11/00* (2006.01)
  *G06F 1/16* (2006.01)
  *G06F 3/16* (2006.01)
  *H04W 4/02* (2018.01)
  *H04W 4/38* (2018.01)
  *H04W 4/80* (2018.01)

(52) U.S. Cl.
  CPC ............ *G02C 5/146* (2013.01); *G02C 11/10* (2013.01); *G06F 1/163* (2013.01); *G06F 3/165* (2013.01); *H04W 4/027* (2013.01); *H04W 4/38* (2018.02); *H04W 4/80* (2018.02); *G02B 2027/0178* (2013.01); *G02C 2200/02* (2013.01); *G02C 2200/08* (2013.01)

(58) Field of Classification Search
  CPC ............ G02B 27/0172; G02B 27/0176; G02B 27/0093; G02B 2027/0178; G02B 2027/014; G06F 3/165; G06F 3/167; G06F 1/1692; G06F 1/1694; G06F 1/163; H04W 4/027; H04W 4/38; H04W 4/80
  USPC ........................................................ 351/158
  See application file for complete search history.

(56) References Cited

U.S. PATENT DOCUMENTS

| | | |
|---|---|---|
| 2013/0250232 A1 | 9/2013 | Belbey et al. |
| 2015/0126845 A1 | 5/2015 | Jin et al. |
| 2015/0248026 A1 | 9/2015 | Willey et al. |
| 2016/0246059 A1 | 8/2016 | Halpin et al. |
| 2016/0299569 A1 | 10/2016 | Fisher et al. |
| 2017/0032646 A1 | 2/2017 | Alameh et al. |
| 2017/0078883 A1 | 3/2017 | Rodriguez |
| 2017/0108715 A1 | 4/2017 | Bauer |
| 2017/0351118 A1* | 12/2017 | Barrau .................. G02C 7/101 |
| 2018/0081201 A1* | 3/2018 | Lore .................. A61B 5/02438 |
| 2018/0088340 A1 | 3/2018 | Amayeh et al. |
| 2018/0097920 A1 | 4/2018 | Hoellwarth et al. |
| 2018/0103139 A1 | 4/2018 | Griffin |
| 2018/0107662 A1* | 4/2018 | Lore .................... G06F 16/436 |
| 2018/0124497 A1 | 5/2018 | Boesen |
| 2018/0234847 A1 | 8/2018 | Rodriguez |
| 2018/0242064 A1 | 8/2018 | Honeycutt |
| 2019/0101977 A1 | 4/2019 | Armstrong-Muntner et al. |
| 2019/0158946 A1 | 5/2019 | Honeycutt |
| 2019/0297701 A1 | 9/2019 | Cao et al. |

\* cited by examiner

__US 12,210,220 B2__

HARDWARE ARCHITECTURE FOR MODULARIZED EYEWEAR SYSTEMS, APPARATUSES, AND METHODS

RELATED APPLICATIONS

This patent application is a continuation of U.S. patent application Ser. No. 16/926,722, titled "HARDWARE ARCHITECTURE FOR MODULARIZED EYEWEAR SYSTEMS, APPARATUSES, AND METHODS," filed on Jul. 12, 2020, which is a continuation of U.S. patent application Ser. No. 16/711,340, titled "MODULARIZED EYEWEAR SYSTEMS, APPARATUSES, AND METHODS." filed on Dec. 11, 2019. This patent application claims priority from U.S. Provisional Patent Application No. 62/778,709 entitled "Modularized Eyewear System with Interchangeable Frame and Temples with Embedded Electronics for Mobile Audio-Visual Augmented and Assisted Reality," filed on Dec. 12, 2018. U.S. provisional patent application No. 62/778,709 entitled "Modularized Eyewear System with Interchangeable Frame and Temples with Embedded Electronics for Mobile Audio-Visual Augmented and Assisted Reality," is hereby fully incorporated by reference. This patent application claims priority from U.S. Provisional Patent Application No. 62/873,889 entitled "Wearable Devices Apparatuses, Systems, And Methods," filed on Jul. 13, 2019. U.S. provisional patent application No. 62/873,889 entitled "Wearable Devices Apparatuses, Systems, And Methods," is hereby fully incorporated by reference. U.S. patent application Ser. No. 16/711,340 entitled "MODULARIZED EYEWEAR SYSTEMS, APPARATUSES, AND METHODS," is hereby fully incorporated by reference.

BACKGROUND OF THE INVENTION

1. Technical Field

The invention relates generally to eyewear devices, and more particularly to apparatuses, methods, and systems for providing information to a user through a modularized eyewear device.

2. Background

The pace of modern life moves at a fast past. A person is often placed under the constraint of time and is placed in situations where his or her hands are occupied and information is not accessible to the person. This can present a problem. Currently available eyewear such as prescription glasses, e.g., prescription reading glasses or prescription sunglasses are expensive and are not readily reconfigured to different user's needs. This can present a problem. Personalized sound transmission is often done with an occlusive in ear device known as an earphone or earbud. Such a device obstructs the ear canal and can interfere with a user's hearing of far field sounds. This can present a problem. Thus, problems exist that requires technical solutions that uses technical means to produce technical effects.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

DETAILED DESCRIPTION

In the following detailed description of embodiments of the invention, reference is made to the accompanying drawings, in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

In one or more embodiments, methods, apparatuses, and systems are described, that provide modularization of an eyewear system for a user. As described in the description of embodiments below, various combinations and configurations of electronics are taught for incorporation into eyewear devices. Some electronics configurations are removably couplable to an eyewear device. In some embodiments, an electronics configuration is built-into an eyewear device. In yet other embodiments, a behind the neck module assembly is releasably couplable with an eyewear device. In various embodiments, the modularized reconfigurable eyewear devices provide information to a user through the eyewear device. As used in this description of embodiments, information includes streaming audio in the form of music, information also includes parameters of a user's biology (e.g., biometrics of physiology, biomechanics, etc.) such as, but not limited to; heart rate, breathing rate, posture, steps, cadence, etc. Information also includes information of interest to a user such as, but not limited to; information on a vehicle that a user is using such as; revolutions per minute (RPM) of a bicycle, engine parameters such as RPM, oil pressure, cooling water temperature, wind speed, depth of water, air speed, etc. In various embodiments, information is presented to a user through an eyewear device by, for example, an audio broadcast that a user hears and a video broadcast to a display that the user sees in the eyewear device, or sees as an image as projected onto a pupil of the user's eye. Thus, information is to be given an expansive meaning within the scope of embodiments taught herein.

Figure 1:
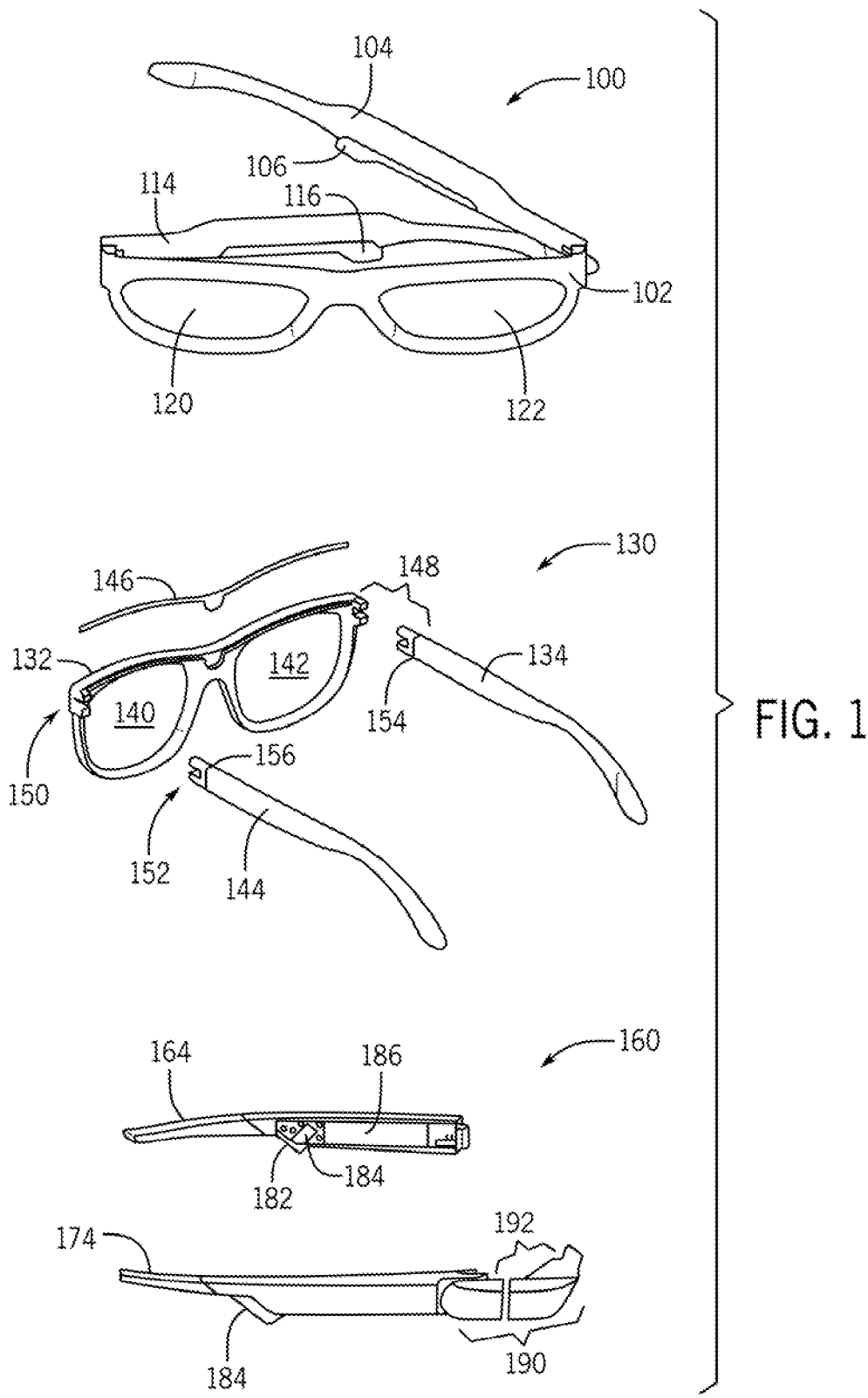
FIG. 1 illustrates a modular reconfigurable eyewear system, according to embodiments of the invention.

FIG. 1 illustrates a modular reconfigurable eyewear system, according to embodiments of the invention. With reference to FIG. 1, a modularized eyewear device is shown in perspective view at 100. The modularized eyewear device 100 has a frame chassis 102. In various embodiments, the frame chassis 102 is ophthalmically constructed to provide frame rim portions that hold lens 120 and lens 122. The lens 120 and 122 can provide any of the functions that eyewear devices provide, such as but not limited to, a safety glass lens, a prescriptive lens, a sunglass lens, a welding glass lens, etc. An eyewear device can also contain a single lens instead of the dual lens illustrated. In some embodiments, a nose pad is provided, thereby providing a cushion for the contact zone with a user's nose. In some embodiments, the nose pad is made from a compliant material such as silicon rubber.

A temple 104 (left temple) and a temple 114 (right temple) are coupled to the frame chassis 102. The temples 104 and 114 can be flexibly coupled to the frame chassis 102, with hinges as shown in the figure or the temples 104 and 114 can be provided with a fixed orientation relative to the frame chassis 102.

In various embodiments, one or more temples (104 and 114) and the chassis frame 102 can be fitted with electronics as described below. Within the view of 100, a left temple insert module (TIM) 106 is configured with the left temple 104 and a right temple insert module (TIM) 116 is configured with the right temple 114. Temple insert modules (TIMs) are described more fully in conjunction with the figures below.

With continued reference to FIG. 1, a modularized eyewear device is shown in exploded view at 130. A frame chassis 132 is ophthalmically constructed to encircle a lens 140 and a lens 142 with a frame rim thereby securing the lens 140 and the lens 142 thereto. A brow bar 146 is fastened to the frame chassis 132 in various ways, via assembly fasteners, adhesive, etc. A left temple 144 includes a left temple connector 152 which is rotatably coupleable with a left chassis connector 150. Together, the left chassis connector 150 and the left temple connector 152 form a rotatable mechanical and electrical connection between the chassis 132 and the left temple 144, thereby providing one or more electrical pathways to connect the frame chassis 132 to the left temple 144. Similarly, a right temple 134 is rotatably coupleable to the frame chassis 132 through a right hinge assembly 148.

Note that in some embodiments, a modularized eyewear device is configured such that each temple can be removed from its hinge via an electrical/mechanical connector having one or more electrical contacts, not shown for clarity in the illustration. These electrical contact points can be made using, for example, pins, points, pads, slots, contact devices, etc. For example, the line indicated at 154 demarcates the mating of the right temple connector with the right temple 134. Similarly, the line indicated at 156 demarcates the mating of the left temple connector 152 with the left temple 144.

Through the provision of electrical/mechanical connectors between each temple, e.g., 134, 144 and the frame chassis 132 the temples are interchangeable with the eyewear device. This functionality permits a user to interchange one temple with another. Different temples can be configured with different electronics to provide different functionality as described herein. Either temple can be configured to accommodate various electronics configurations. For example, in one or more embodiments, the right interchangeable temple accommodates an electronics package that can include one or more of; a biometric sensor, a biomechanical sensor, a vehicle sensor, an environmental sensor, a temperature sensor, an acoustic sensor, a motion sensor, a light sensor, a touch sensor, a proximity sensor, a velocity sensor, an acceleration sensor, a rotation sensor, a magnetic field sensor, a global position system (GPS) receiver, cables, microphones, a micro speaker, a source of electrical power (battery), a camera, a micro display, a heads-up display (HUD) module, a multiaxis inertial measurement unit, a wireless communications system. Note that a TIM can also contain the electronics package and sensor(s) described above. In various embodiments, one or more wireless communication system are provided that utilize for example; near-field communications (NFC) using the industrial-scientific-medical (ISM) frequency of 13.56 MHz, the Adaptive Network Topology (ANT) ANT+wireless standard, wireless communications using a Bluetooth standard, a Bluetooth low energy standard (BLE), wireless communication using a Wi-Fi standard, and wireless communication using mobile telephone standards such as for example the 3G, 4G, Long Term Evolution (LTE), 5G, etc. standard or other wireless standards. In some embodiments, electrical pathways from the electronics exit a temple via a sheath cavity and travel into a temple sheath and continue into a brow bar sheath cavity. The right interchangeable temple contains a hinge-connector 148 that fastens to the brow bar 146 and chassis frame 132.

In one or more embodiments, the right interchangeable temple attaches to the front of the frame chassis via a hinge-connector that allows for power and data transferred to the left interchangeable temple through the modular brow bar. The hinge-connector mechanically interlocks with the frame chassis and allows for power/data connectivity with electrical pin conductors. In one or more embodiments, when positioned in the open direction of wearing, the hinge-connectors sense the open state of the device allowing for power or data transfer. When in the closed position (temples folded inward), the hinge-connector in conjunction with signals received from one or more of proximity sensors and motion sensors will allow the system to sense the user-device interaction state and will deactivate the power or data transfer. This function leads to reduced power consumption when folded and stowed and can lead to automatic power up while a user wears the device on his or her head. In addition to switchable data or power transfer from the hinge-connector, the hinge-connector can provide flexible circuits and wired micro-connectors that provide steady uninterrupted power and or data transfer.

In some embodiments, it is convenient to route electrical pathways within a volume of the brow bar 146. In some embodiments, the brow bar 146 is constructed to provide a channel along its length, within which the electrical pathways are routed. Thus, the brow bar 146 provides one or more sheaths, channels, etc. along its length within which electrical pathways and sensors can be contained. Examples of electrical pathways are, but are not limited to; wires, printed circuit board, flexible printed circuit board, etc. In various embodiments, it is advantageous to mount one or more sensors to the brow bar 146, thereby making an electrical sub-assembly for the frame chassis 132. In some embodiments, additional electrical pathways from the frame chassis 132 are joined with the electrical pathway contained in the brow bar 146. In some embodiments, a flexible electronic circuit is adhered to the underside top face of the brow bar and exits the brow bar via the left and right sheath cavities. Alternatively, or in combination, fully embedded flexible electronics may be cast into the brow bar with integrated contact points exiting the brow bar near each hinge. These integrated contact points on both sides of the brow bar allow transmission of data or power when in contact with the integrated contact points of the right and left temple. In addition to facilitating connection to electronics, the brow bar can conceal an optional pupil module by a securing flange and allows the user to view a microdisplay via the brow bar pupil aperture.

In similar fashion the left temple is configured as a left interchangeable temple connected to the front frame of the eyewear with a left hinge-connector. In various embodiments, the left interchangeable temple can contain the same electronics configuration/functionality as the right interchangeable temple or interchangeable temples can contain different electronics configurations and different functionality.

With continued reference to FIG. 1, a left temple 164 and right temple 174 are configured as shown at 160. Each of the temples 164 and 174 contain electronics which are configured to provide information and functionality to a user of the eyewear system. As shown at 160, the left temple 164 has a temple door (not shown) removed thereby exposing an electronics package indicated at 186. The temple door secures and protects electronics from environmental exposure and hazard. The temple door is secured to the temple assembly with suitable mechanical fasteners for a given application. In some embodiments, the temple door provides a rating with respect to water intrusion via an IP Code from International Protection Marking IEC standard 60529. A source of electrical power (battery) is illustrated at 184 and an audio speaker and port is illustrated at 182. The audio speaker and port 182 is generally located on a posterior end of a temple and in some embodiments is an integrated directional projection speaker that privately directs sound to a user's ear. Projection stereo speakers can communicate various audio signals to the user, such as but not limited to, voice prompts, streaming music, smart audio assistance, data, etc. Notably, the projection speaker design does not occlude the user's ear. Thus, the user can hear far field sounds and the far field sounds are not degraded as they are with currently available earbud style headphones that occlude a user's ear.

The right temple 174 is also provided with an electronics package (not shown in the view) contained within the right temple 174. The right temple is provided with an audio speaker with audio speaker port 184, which can be an integrated directional projection speaker. In one or more embodiments, the right temple 174 is configured to accommodate an external assembly 190 that contains a micro display assembly 192. Similarly, the left temple could be configured for the external assembly 190 and the micro display assembly 192.

In various embodiments, a micro display assembly, such as 192, is a head up display (HUD) Pupil™ Optics Module that houses the optics, electronics, and micro display that form the optical system. The pupil mechanism also may house cables, flexible circuit boards, or wires which exit from a housing into an electronics contact pathway. In one or more embodiments, these electrical pathways are connected to a side of the left temple 174 to enable the user with a see-through head up display external accessory to enhance a visual component of a mobile reality experience.

In one or more embodiments, wiring which exits the brow bar is concealed in the right and left sheaths of the temples and enters into the right and left temples via the sheath cavities, thereby protecting the wiring from environmental hazards. The area near the contact pathway may also accommodate motion mechanisms for customizing the interpupillary distance of the head-up micro display module.

In different embodiments, the front frame portion, such as 102 or 132 (FIG. 1) or any similar structure in the figures below, and the right and left temple portions, such as 104, 114, 134, 144, 164, 174 (FIG. 1) or any similar structures in the figures below, can be part of a set of interchangeable front frame portions and temple portions each having the same or different combinations of devices, accessories, capabilities and/or functions. At least one of an electronics board, microphones, speakers, battery, camera, heads-up display module, wireless Wi-Fi radio, GPS chipset, LTE cellular radio, multiaxis inertial measurement unit, motion sensor, touch sensor, light and proximity sensors, etc. can be included in desired combinations. Electronics can be further included that permit a user to perform at least one of; wirelessly connecting to a cellular service, a smart phone, a smart watch, a smart bracelet, a mobile computer, and a sensor peripheral. The electronics can further include the ability to; view see-through augmented reality images via a modular head up display (HUD), provide stereo audio content, provide voice and audio notification including music through one or more integrated projection microspeakers. The front frame electrical contact devices and the temple electrical contact devices can include electrical contact points in or near respective hinge connectors for removable electrical contact with each other for electrically transmitting at least one of; power, electrical signals and data between the temple portions and the front frame portion when the contact points are in an electrically closed position. In some embodiments when assembled together, the front frame hinge connectors, the front frame electrical contact devices, the temple hinge connectors and the temple electrical contact devices can form electromechanical hinges, hinge connectors, assemblies or devices. In some embodiments, system electrical power can be turned off by folding the temple portions into a storage position thereby disconnecting the contact points.

In some embodiments, at least one of the front frame electronics and the temple electronics can include at least one of a battery, camera, heads-up display module, controller, digital storage electronics. CPU, projection microspeaker, microphone, wireless Wi-Fi radio, GPS chipset, LTE cellular radio, multiaxis inertial measurement system or unit, and sensory, motion, touch, light, proximity, temperature and pressure sensors, etc.

In some embodiments, at least one temple can include a temple module insert (TIM) containing selected temple electronics, mounted thereto. In other embodiments, a neck smart cord is electrically connected to a behind the neck electronics module. The neck smart cord has right and left connectors or connector ends for mechanically and or electrically interconnecting the behind the neck electronics module with the right and left temples of an eyewear device.

Figure 2:
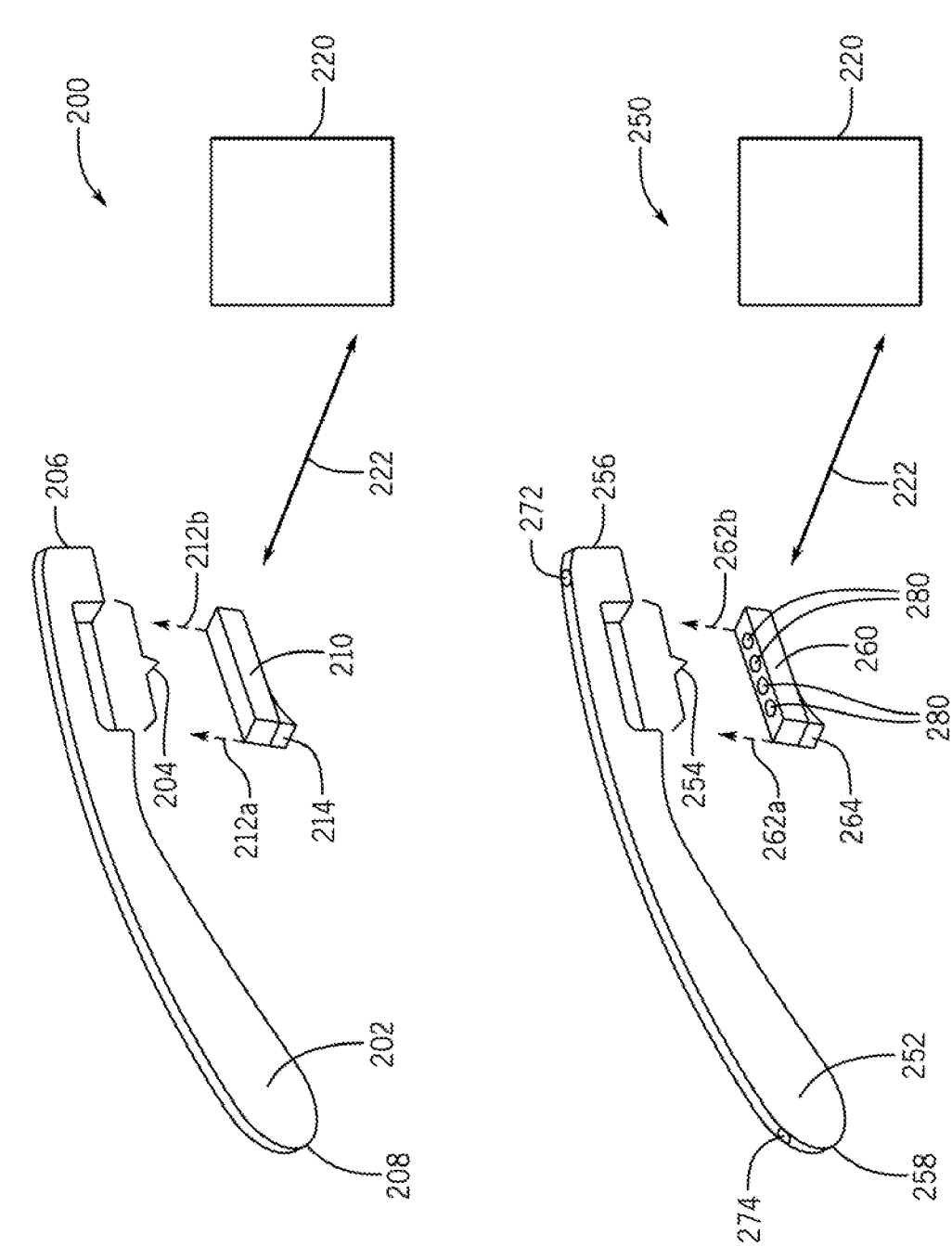
FIG. 2 illustrates a reconfigurable component for an eyewear device, according to embodiments of the invention.

FIG. 2 illustrates a reconfigurable component for an eyewear device, according to embodiments of the invention. With reference to FIG. 2 at 200, a temple 202 is provided with an engagement portion 204. A temple insert module, referred to in this description of embodiments as a "TIM" at 210 is configured to be releasably coupleable with the engagement portion 204 of the temple 202. The TIM 210 is installed into the temple 202 as indicated by arrows 212a and 212b. In various embodiments, the engagement portion 204 is accomplished by a mechanical connection, such as but not limited to; press fit, clip, mechanical interlock, hook and loop, magnetic surface, external clamp to temple, flange and mechanical coupling to temple, etc. In yet other embodiments the engagement portion 204 and the TIM 210 utilize magnetic surfaces, thereby holding the TIM 210 secure by magnetic attraction. The form of the engagement portion shown at 204, as well as the form of any engagement portion illustrated elsewhere in the figures presented herein, is given merely for illustration and does not limit embodiments of the invention. In the view illustrated at 200, the TIM 210 only makes a mechanical connection with the temple 202 no electrical connection is provided between the TIM 210 and the temple 202.

In some embodiments, the TIM 210 is provided with a speaker and speaker port 214, which can be a micro projection speaker. The speaker provides information to a user through an audio broadcast. Note that the speakers provided herein are speakers that are located externally from a user's ear and are therefore not inserted into the user's ear like an earbud is inserted. The TIM 210 is configured with an electronics package that contains a processor, memory, electrical power, and one or more wireless communication protocols that enable the TIM 210 to communicate wirelessly 222 with one or more devices 220. The device 220 can be an external sensor such as, but not limited to: a biometric sensor or a vehicle sensor, a local user device, a network node, such as a wireless router, a remote network, or a remote user device such as a mobile phone accessed through a network. Different sensors, networks, and remote devices are described more fully in conjunction with the figures below.

Following the architecture of FIG. 2 at 200, in some embodiments, a second temple and a second TIM are provided. The two TIMs in such a system can engage in wireless communication between the device 220 and between themselves as needed to provide a level of design functionality to a user. For example, in one embodiment, a left TIM includes wireless network capability sufficient to communicate with the remote device 220, utilizing a first network protocol. In addition, the left TIM and the right TIM are provided with wireless network capability that supports communication utilizing a second network protocol. In order to conserve electrical power, the first network protocol has a greater range than the second network protocol because a distance between the left TIM and the remote device is greater than a separation distance between the left TIM and the right TIM (nominally a width of user's head). The architecture illustrated at 200 is referred to as true wireless because there is no wired connection between the left TIM and the right TIM. In one or more embodiments, an audio stream is provided from a user device to a first TIM utilizing a first wireless network. Then a second wireless audio stream is provided from one TIM to the other TIM utilizing a second wireless network in order to provide the audio stream to each of a left and a right projection speakers of the eyewear device.

The temples and TIMs described at 200 provide reconfigurable components for eyewear devices as described in conjunction with the figures herein. A forward end 206 of the temple 202 is engageable with a frame chassis of an eyewear device as described above with or without a connector between a temple and a frame. Thus, the temple 202 can attain a fixed position relative to a frame chassis or the temple can be rotatably coupled to the frame chassis depending on a give design of the eyewear.

With reference to FIG. 2 at 250, a temple 252 is provided with an engagement portion 254. A temple insert module, TIM at 260, is configured to be releasably coupleable with the engagement portion 254 of the temple 252. The TIM 260 is installed into the temple 252 as indicated by arrows 262a and 262b. In various embodiments, the engagement portion 204 is accomplished by a combined electrical and mechanical connection. The mechanical connection can be as described in conjunction with 2104204 such as, but not limited to; press fit, clip, mechanical interlock, hook and loop, etc. In yet other embodiments the engagement portion 254 and the TIM 260 utilize magnetic surfaces, thereby holding the TIM 260 secure by magnetic attraction. A number of electrical contacts 280 are provided for illustration with no limitation implied thereby. The electrical contacts 280 mate with corresponding electrical contacts in the temple 252 thereby providing electrical connection to one or more electrical pathways (not shown) in the temple 252. The electrical pathways within the temple 252 facilitate electrical connection between the TIM 260 and one or more sensors 272 and 274, which can also represent a source of signals provided to a display(s). The sensors 272 and 274 can be acoustic sensors such as microphones or any of the sensors described herein for use in conjunction with electronics packages configured with eyewear devices. In one or more embodiments, one or more of 272 and 274 provide signals to a display such as a HUD.

In some embodiments, the TIM 260 is provided with a speaker and speaker port 264, which can be a micro projection speaker. The speaker provides information to a user through an open-ear audio broadcast.

Following the architecture of FIG. 2 at 250, in some embodiments, a second temple and a second TIM are provided, as shown below in FIG. 3. The two TIMs in such a system engage in wireless communication between the device 220 and between themselves as needed to provide a level of design functionality to a user. The temples and TIMs described at 250 provide reconfigurable components for eyewear devices as described in conjunction with the figures herein. For example, a forward end 256 of the temple 252 is engageable with a frame chassis of an eyewear device as described above with or without a connector between a temple and a frame. Thus, the temple 252 can attain a fixed position relative to a frame chassis or the temple can be rotatably coupled to the frame chassis depending on a given design of the eyewear.

Figure 3:
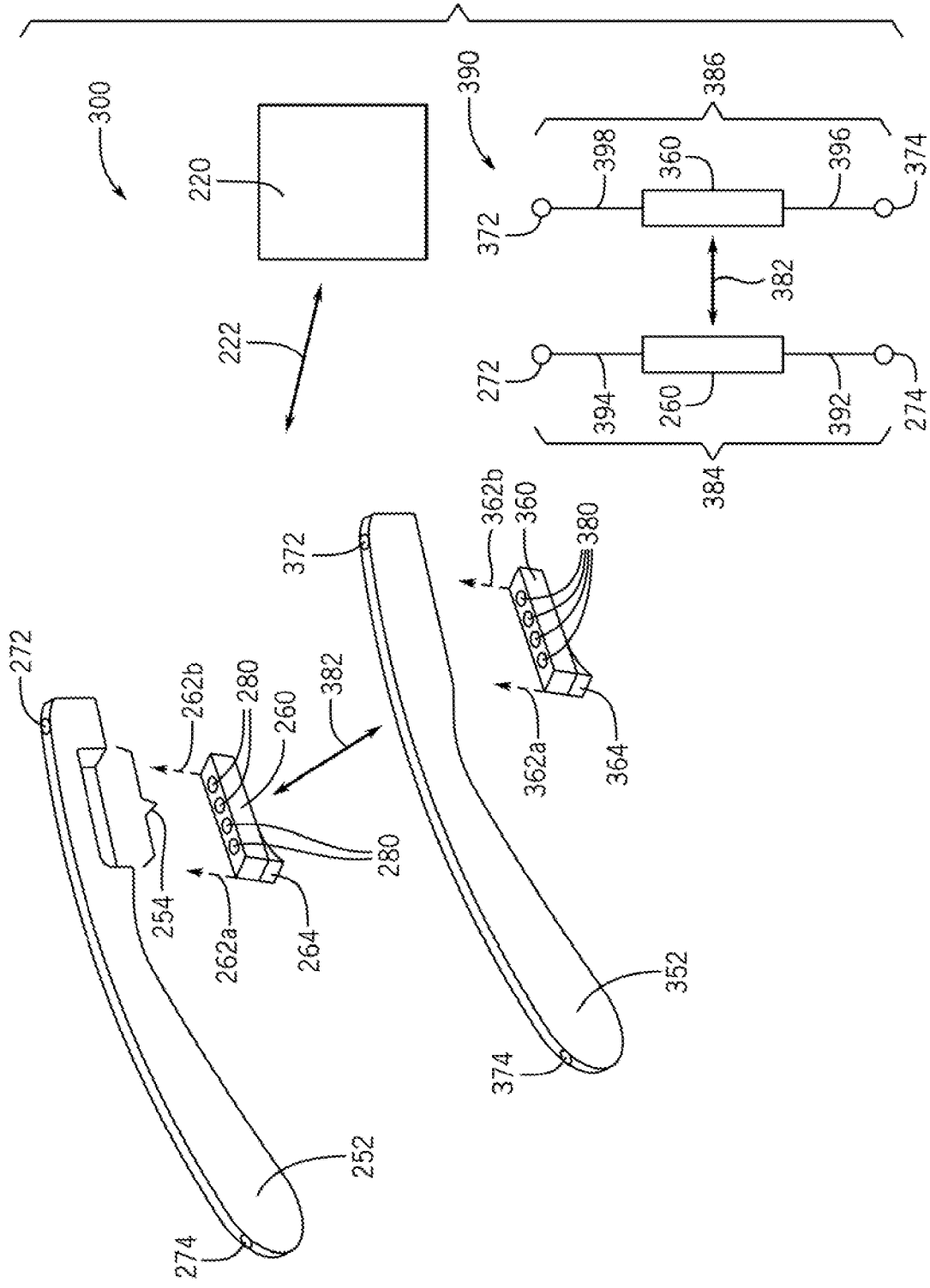
FIG. 3 illustrates multiple reconfigurable components for an eyewear device, according to embodiments of the invention.

FIG. 3 illustrates, at 300, multiple reconfigurable components for an eyewear device, according to embodiments of the invention. With reference to FIG. 3 at 300, the left reconfigurable component 250 from FIG. 2 is illustrated with a companion right reconfigurable component for an eyewear device. A right temple 352 has an engagement portion that is not shown in FIG. 3 but is similar to the engagement portion 254 of the left temple 252. A temple insert module, TIM at 360 is configured to be releasably coupleable with the engagement portion of the temple 352. The TIM 360 is couple with the temple 352 as indicated by arrows 362a and 362b. In various embodiments, the engagement portion of the temple 352 is accomplished by a combined electrical and mechanical connection. The mechanical connection can be provided as described above in conjunction with 210/204 such as, but not limited to; press fit, clip, mechanical interlock, hook and loop, etc. In yet other embodiments the engagement portion of the temple 352 and the TIM 360 utilize magnetic surfaces, thereby holding the TIM 360 secure by magnetic attraction. Several electrical contacts 380 are provided for illustration with no limitation implied thereby. The electrical contacts 380 mate with corresponding electrical contacts in the temple 352 thereby providing electrical connection to one or more electrical pathways (not shown) in the temple 352. The electrical pathways within the temple 352 facilitate electrical connection between the TIM 360 and one or more sensors 372 and 374. The sensors 372 and 374 can be acoustic sensors such as microphones or any of the sensors or displays described herein for use in conjunction with electronics packages configured with eyewear devices. In various embodiments, the TIM 360 is configured with an electronics package that contains a processor, memory, electrical power, and one or more wireless communication systems using protocols that enable the TIM 360 to communicate wirelessly as indicated by a wireless transmission at 222 with one or more devices 220. In addition, the TIM 360 and the TIM 260 can be configured with wireless communication capability that permits wireless communication between the TIMs as indicated by a wireless transmission at 382. In some embodiments, the TIM 360 is provided with a speaker and a speaker port indicated at 364, which can be a micro projection speaker. The speaker provides information to a user through an audio broadcast.

With reference to view 390 of FIG. 3, electrical connectivity schematics are illustrated for each of TIM 260 and TIM 360. The TIM 260 is electrically coupled to the sensor 272 with an electrical pathway 394. Similarly, the TIM 260 is electrically coupled to the sensor 274 by an electrical pathway 392. The connectivity illustrated between the TIM 260 and the respective sensors constitutes a left temple electrical schematic 384. Note that the left temple electrical schematic 384 can be more complex or less complex that the illustration. Thus, the left temple electrical schematic is provided merely for illustration with no limitation implied thereby.

Similarly, the TIM 360 is electrically coupled to the sensor 372 with an electrical pathway 398. The TIM 260 is electrically coupled to the sensor 374 by an electrical pathway 396. The connectivity illustrated between the TIM 360 and the respective sensors constitutes a right temple electrical schematic 386. Note that the right temple electrical schematic 386 can be more complex or less complex that the illustration. Thus, the right electrical schematic is provided merely for illustration with no limitation implied thereby.

The two TIMs in such a system engage in wireless communication between the device 220 and between themselves as needed to provide a level of design functionality to a user. For example, in one embodiment, a left TIM includes wireless network capability sufficient to communicate with the remote device 220, utilizing a first network protocol. In addition, the left TIM and the right TIM are provided with wireless network capability that supports wireless communication as indicated at 382. The wireless communication 382 can be performed with a second network protocol, which is different from that used at 222. In order to conserve electrical power, the first network protocol (222) has a greater range than the second network protocol (382) because a separation distance between the left TIM 260 and the remote device 220 is greater than a separation distance between the left TIM 260 and the right TIM 360, the latter is nominally a width of user's head and the former can be as much as a distance to a mobile telephone cellular tower.

Figure 4:
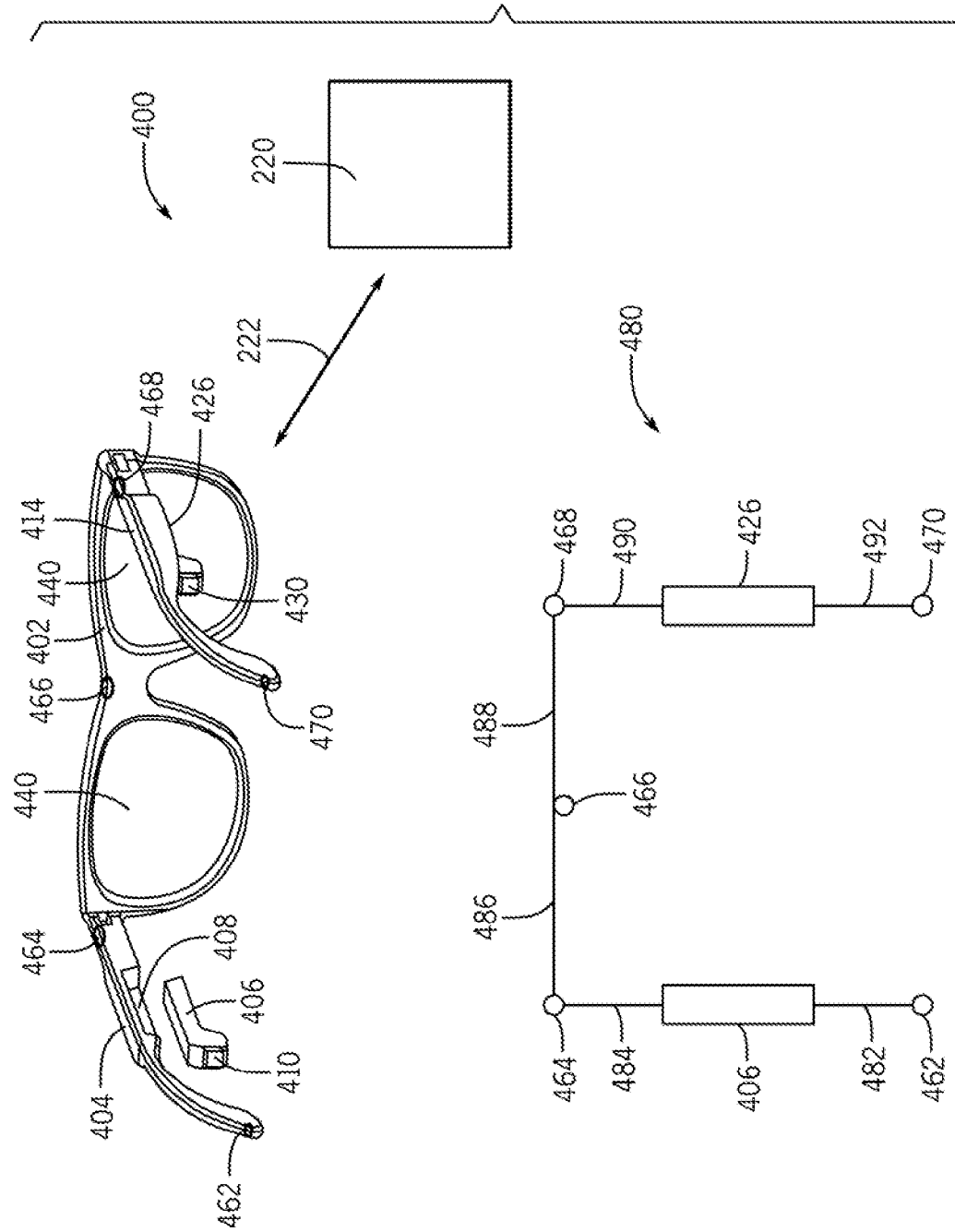
FIG. 4 illustrates another reconfigurable modularized eyewear system, according to embodiments of the invention.

FIG. 4 illustrates another reconfigurable modularized eyewear system, according to embodiments of the invention. With reference to FIG. 4, one or more of sensors, power components, and computational units are distributed throughout an eyewear device, including distributed throughout a frame chassis such as 402. A frame chassis 402 is ophthalmically constructed to encircle lens 440 with frame rims thereby securing the lens 440 thereto. A left temple 404 are a right temple 414 are coupled to the frame chassis 402, thereby forming an eyewear device. The left temple 404 is configured with an engagement portion indicated at 408. A left temple insert module (TIM) 406 is configured as described above to engage with the engagement portion 408, thereby providing both mechanical and electrical connection between the TIM 406 and the temple 404. Similarly, a right temple 426 is illustrated as engaged with the engagement portion of the right temple 414. The TIM 406 contains an audio speaker and audio port indicated at 410 and the TIM 426 contains an audio speaker and audio port indicated at 430. In various embodiments, the audio speakers of 410 and 430 are projection speakers. The eyewear device includes several sensors or display(s), 462, 464, 466, 468, and 470 that are integrated into an electrical pathway that extends from the left temple 404 through the frame chassis 402 to the right temple 414. In various embodiments there can be more sensors or less sensors that those shown in FIG. 4. The sensors and the locations of the sensors shown in FIG. 4 are provided merely as an illustration and do not limit embodiments of the invention. As described above in conjunction with the previous figures, at least one of the temple insert modules. 406 and or 426, are provided with a suite of electronics necessary to provide wirelessly connectivity 222 to a device 220.

In the eyewear device of 400, a high-level view of an electrical pathway schematic is shown at 480. With reference to 480, the left TIM 406 and the right TIM 426 are electrically coupled with sensors 462, 464, 466, 468, and 470 by electrical pathway elements 482, 484, 486, 488, 490, and 492. An electrical pathway element, such as 484, electrically connects the sensor 464. Together, the components shown in 480 provide a modularized reconfigurable set of components for an eyewear device. In one or more embodiments, one or more acoustic sensors are located in at least one of, the frame chassis 402, the left temple 404, and the right temple 414. Thus, acoustic sensors can be located anywhere on a temple (left or right) or a frame chassis of the eyewear device.

Figure 5:
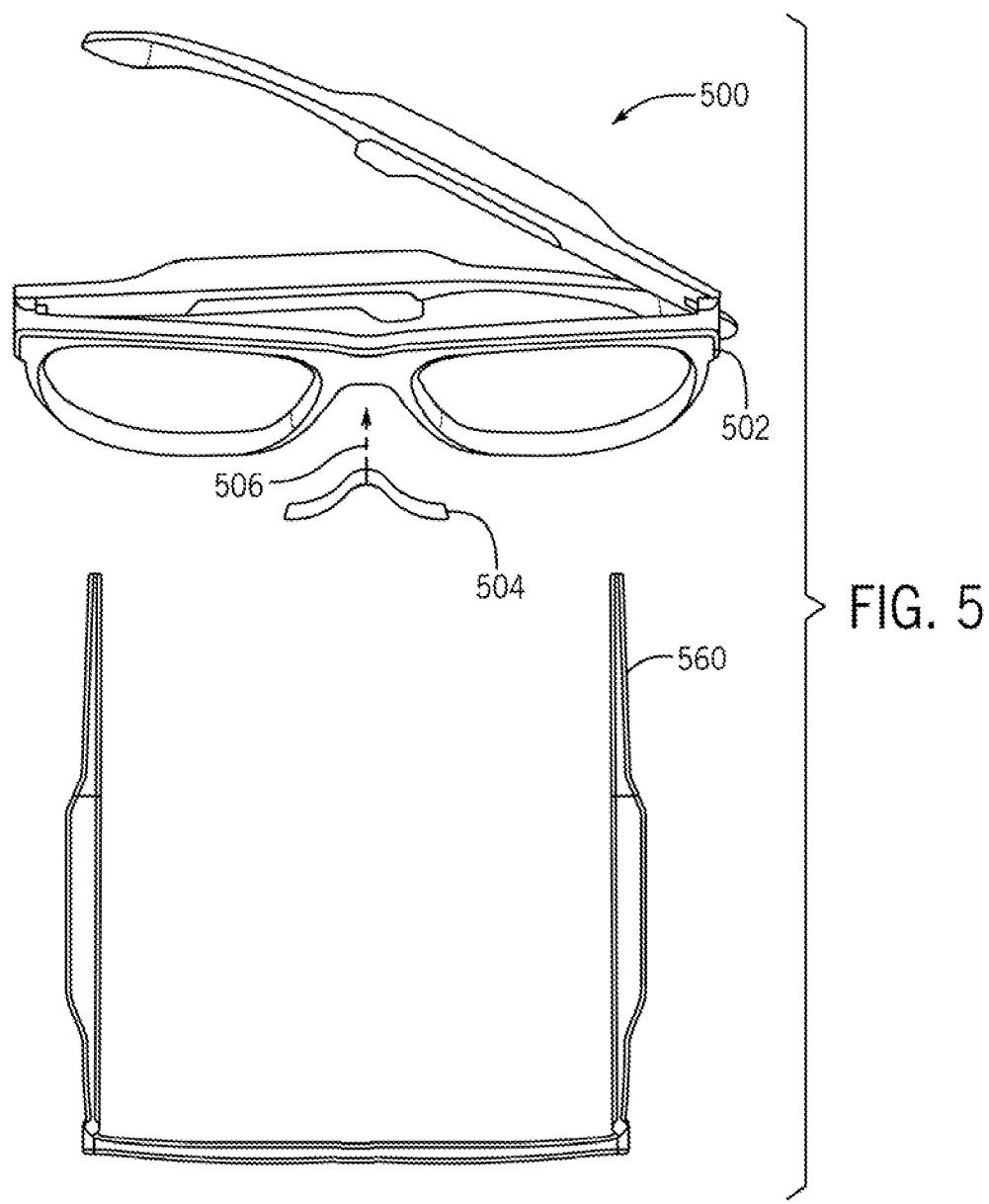
FIG. 5 illustrates a perceptive view and a top view of the modularized eyewear system from FIG. 4, according to embodiments of the invention.

FIG. 5 illustrates, generally at 500, a perceptive view and a top view of the modularized eyewear system from FIG. 4, according to embodiments of the invention. With reference to FIG. 5, a modularized eyewear device is illustrated in perspective view at 502. A modularized nose pad 504 is releasably couplable as indicated at 506 with the modularized eyewear device 502. Modularization of nose pads permits a user to swap nose pads in order to improve the fit between the eyewear and the user's nose and facial structure. A greater level of comfort can be achieved through modularization of the nose pad of the eyewear device. In addition, other sensors such as a biometric sensor can be provided in the nose pad.

Figure 6A:
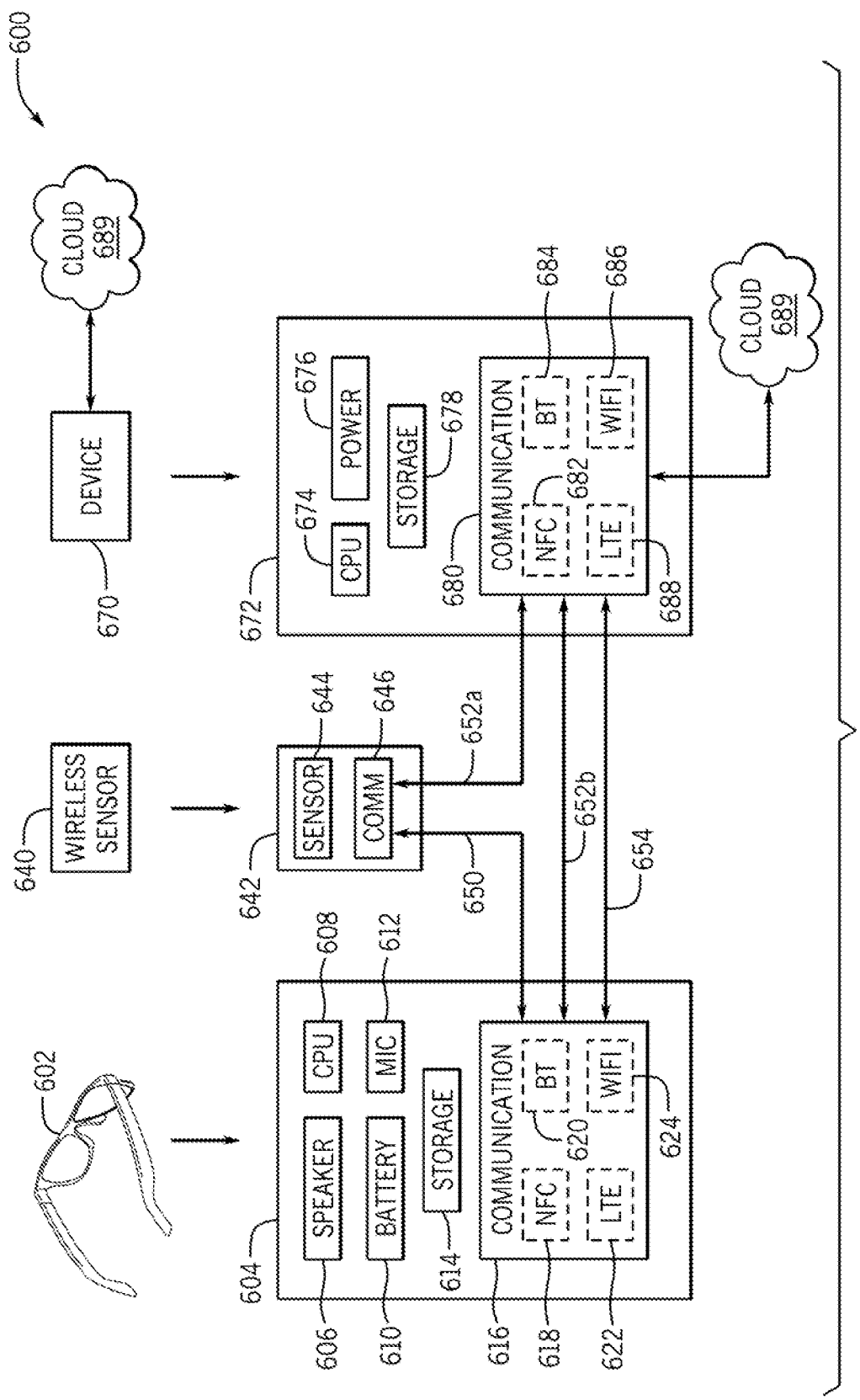
FIG. 6A illustrates a system architecture for a modularized eyewear device, according to embodiments of the invention.

FIG. 6A illustrates, generally at 600, a system architecture for a modularized eyewear device, according to embodiments of the invention. With reference to FIG. 6A, in various embodiments, a modularized reconfigurable eyewear device can contain more than one wireless communication system. In various embodiments, an eyewear device 602 has a high-level block diagram architecture as shown at 604. In various embodiments, the eyewear device 602 is configured to communicate with a wireless sensor 640 and a mobile device 670. The wireless sensor 640 can contain a single sensor or a plurality of sensors. The wireless sensor 640 can contain any one or more of the sensors listed herein without limitation. For example, the wireless sensor 640 can include a biometric sensor or biomechanical sensor configured for use with a user or a sensor configured for use with a vehicle or building. Some examples of biometric sensors are, but are not limited to; a heart rate monitor, a perspiration sensor, a temperature sensor, etc. Some examples, of vehicle sensors are, but are not limited to; a velocity sensor, an acceleration sensor, a global position system signal, a vehicle engine parameter, a wind speed indicator, etc. Some examples of sensors for use with a building are, but are not limited to; a temperature reading from a thermostat, a water pressure value, etc. Some non-limiting examples of vehicles are, but are not limited to; a scooter, bicycle, an automobile, a boat, a yacht, a watercraft, an airplane, a military vehicle, a wing suit, etc. In some embodiments, data is received at 640 and or 616 from a special use network. An example, of a special use network, given for illustration with no imitation implied thereby, is a National Marine Electronics Association (NMEA) NMEA 2000 network designed for watercraft such as yachts (power or sail). NMEA 2000, also referred to in the art as "NMEA2k" or "N2K" is standardized as International Electrotechnical Commission (IEC) 61162-1. NMEA 200 is a plug-and-play communications standard used for connecting marine sensors and display units within ships, boats, yachts, etc. The mobile device 670 can be any one or more of the mobile devices listed herein without limitation. For example, the mobile device can be a mobile phone, a watch, a wrist band, a bracelet, a tablet computer, a laptop computer, a desktop computer, a vehicle computer, etc.

The eyewear device 602 has a high-level architecture, represented at 604, that contains a speaker 606, a central processing unit 608, a source of electrical power 610, an acoustic sensor 608, a storage device 614, and a wireless communication system 616. Wireless communication system 616 can contain one or more of the following wireless communication systems, e.g., a near-field communication system 618, a wireless communication system utilizing the Bluetooth communication protocol 620, a wireless communication system utilizing the Wi-Fi communication protocol at 624, a mobile telephone communications protocol 622. The wireless communication protocol designated by LTE at 622 is given merely as an example for wireless devices and does not limit embodiments of the invention. Those of skill in the art will recognize that one or more antennas are included, but not shown for clarity, in the wireless communication system block 616.

The wireless sensor 640 has a high-level architecture, represented at 642, that includes one or more sensors 644 and a wireless communication system 646. The wireless communications system 646 can be a low data rate communications system such as a near-field communications system, BLE, ANT+, or the like. Or the wireless communication system 646 can be provided as a higher data rate system as required by the sensor(s) 644.

The mobile device 670 has a high-level architecture, represented at 672, that includes, a central processing unit 674, a source of electrical power 676, storage 678, and one or more wireless communication systems indicated at the block 680. The mobile device 670 can be optionally configured to reach remote networks as indicated by cloud 689. The wireless communication block 680 can include one or more of the following wireless communication systems, e.g., a near-field communication system 682, a wireless communication system utilizing the Bluetooth communication protocol 684, a wireless communication system utilizing the Wi-Fi communication protocol at 686, and a mobile telephone communications protocol at 688. The wireless communication protocol designated by LTE at 688 is given merely as an example of a communication system for mobile devices and does not limit embodiments of the invention. Those of skill in the art will recognize that one or more antennas are included, but not shown for clarity, in the wireless communication system block 680 and 642.

In some embodiments, the wireless sensor system 642 and the eyewear device 602 are configured initially by a user of the mobile device 670 and the mobile device user interface as indicated by pathways 652a and 652b. In operation, the eyewear device 602 receives data wirelessly as indicated at 650 from a suitable wireless communication system, such as for example a near-field communications system 618. Wireless data obtained from the wireless sensor system 642 can be transmitted to the user device 670/672 by another wireless communication system such as indicated at 654. The wireless communication indicated at 654 can be accomplished with a higher data rate channel using for example Bluetooth protocol at 620/684, or Wi-Fi protocols at 624/686, or mobile phone communications protocol indicated at 622/688. Data transferred from the eyewear device 602 can be stored and analyzed on the user device 670 in various embodiments and with different application programs.

Figure 6B:
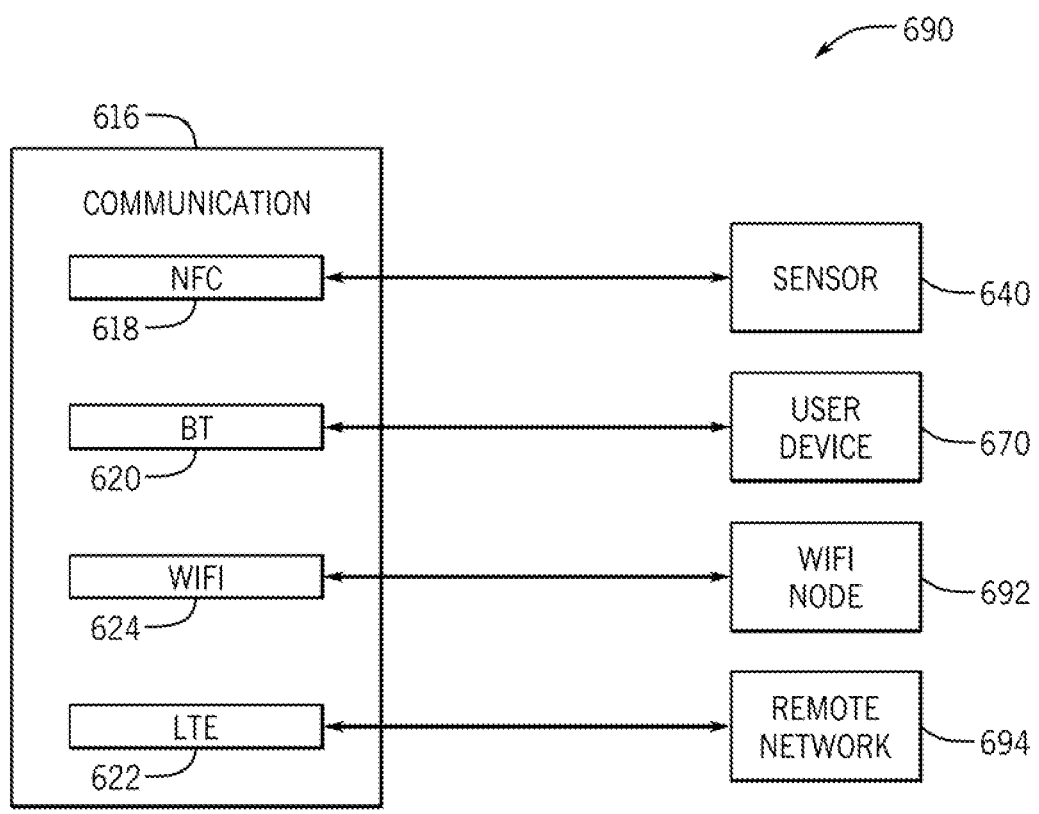
FIG. 6B illustrates wireless networks corresponding to the system architecture for the modularized eyewear device of FIG. 6A, according to embodiments of the invention.

FIG. 6B illustrates, generally at 690, wireless networks corresponding to the system architecture for the modularized eyewear device of FIG. 6A, according to embodiments of the invention. With reference to FIG. 6B, the wireless communication block 616 can connect to a plurality of devices as shown in the figure. For example, one or more wireless sensors 640 can connect to the wireless communication block 616 utilizing low data rate near-field communication networks as indicated at 618. One or more user devices 670 can communicate wirelessly with the wireless communication block using Bluetooth communication protocols as indicated at 620. One or more wireless nodes, such as Wi-Fi nodes indicated at 692 can communicate wirelessly with the wireless communication block 616 as indicated at

624. One or more remote networks 694 can communicate wirelessly with the wireless communication block 616 using cellular communication protocols as indicated at 622. Thus, a reconfigurable eyewear device can contain one or more of the wireless communication systems shown in the illustration at 690. An eyewear device can be reconfigured for different wireless communication by swapping for example one TIM module for another. Alternatively, one or more temples can be swapped with a frame chassis as described above to provide customized functionality to an eyewear device.

Figure 7:
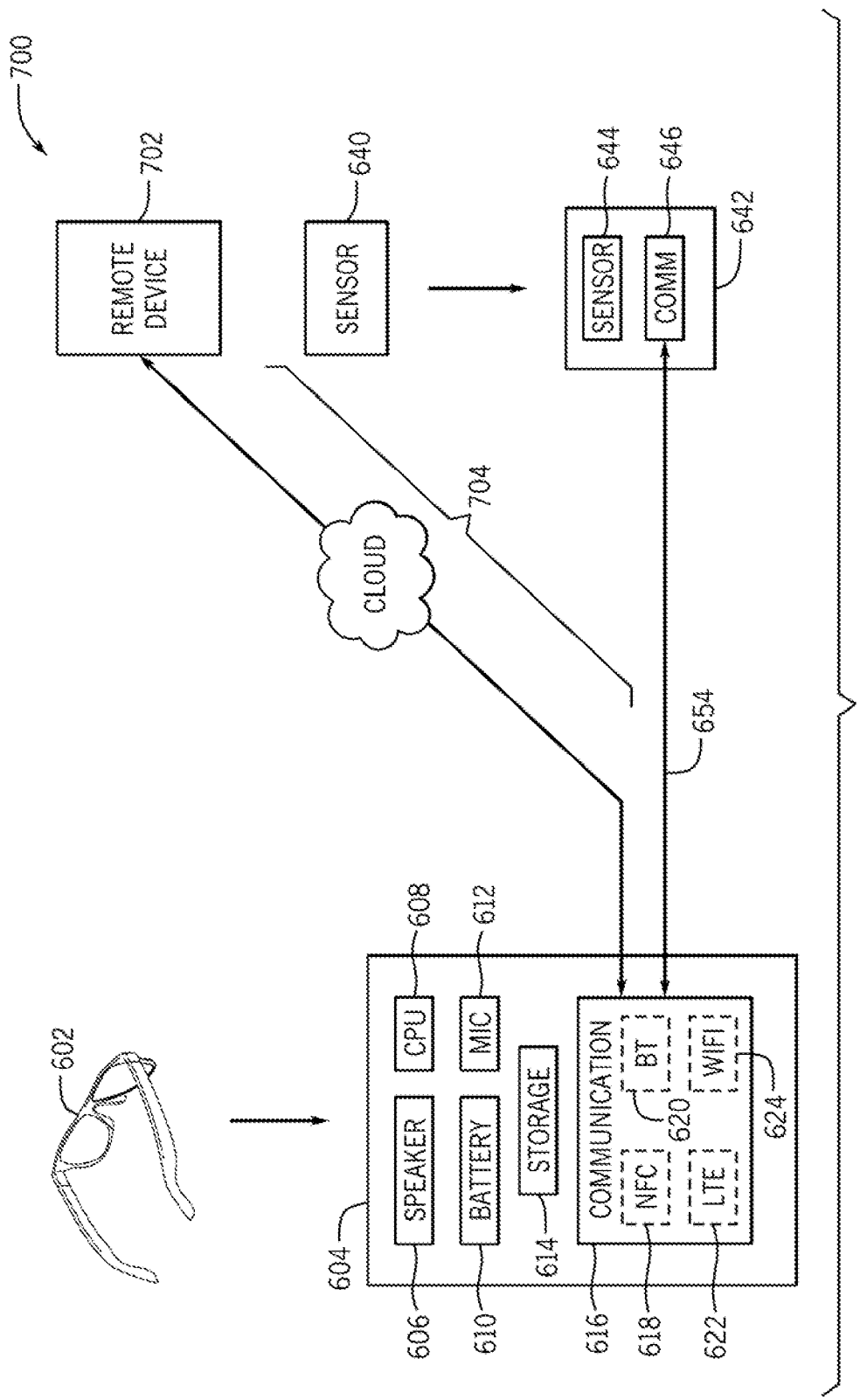
FIG. 7 illustrates another system architecture for the modularized eyewear device of FIG. 4, according to embodiments of the invention.

FIG. 7 illustrates, generally at 700, another system architecture for the modularized eyewear device of FIG. 4, according to embodiments of the invention. With reference to FIG. 7, the wireless communication block 616 of the eyewear device 602 can be configured for cellular communications via mobile telephone networks directly without needing a user device to function as an intermediary. For example, in 700, the eyewear device 602 is configured for communication with a remote device 702, which can be a mobile telephone, by a wireless communication system 622 thereby connecting with the remote device 702 directly through the external networks indicated by cloud 704. No intermediary user mobile device is needed to support this line of communication. Such a configuration of an eyewear device allows a user of the eyewear device to make telephone calls from the eyewear device with the assistance of an interface, such as a voice interface, one or more tactile interface like buttons, etc. The voice interface provides command and control of the telephone call by converting the user's voice signals to commands that the device uses to facilitate the operation of the wireless network for the telephone call. Examples of such commands are, but are not limited to; select caller, place call, volume up, volume down, end call, etc.

Figure 8:
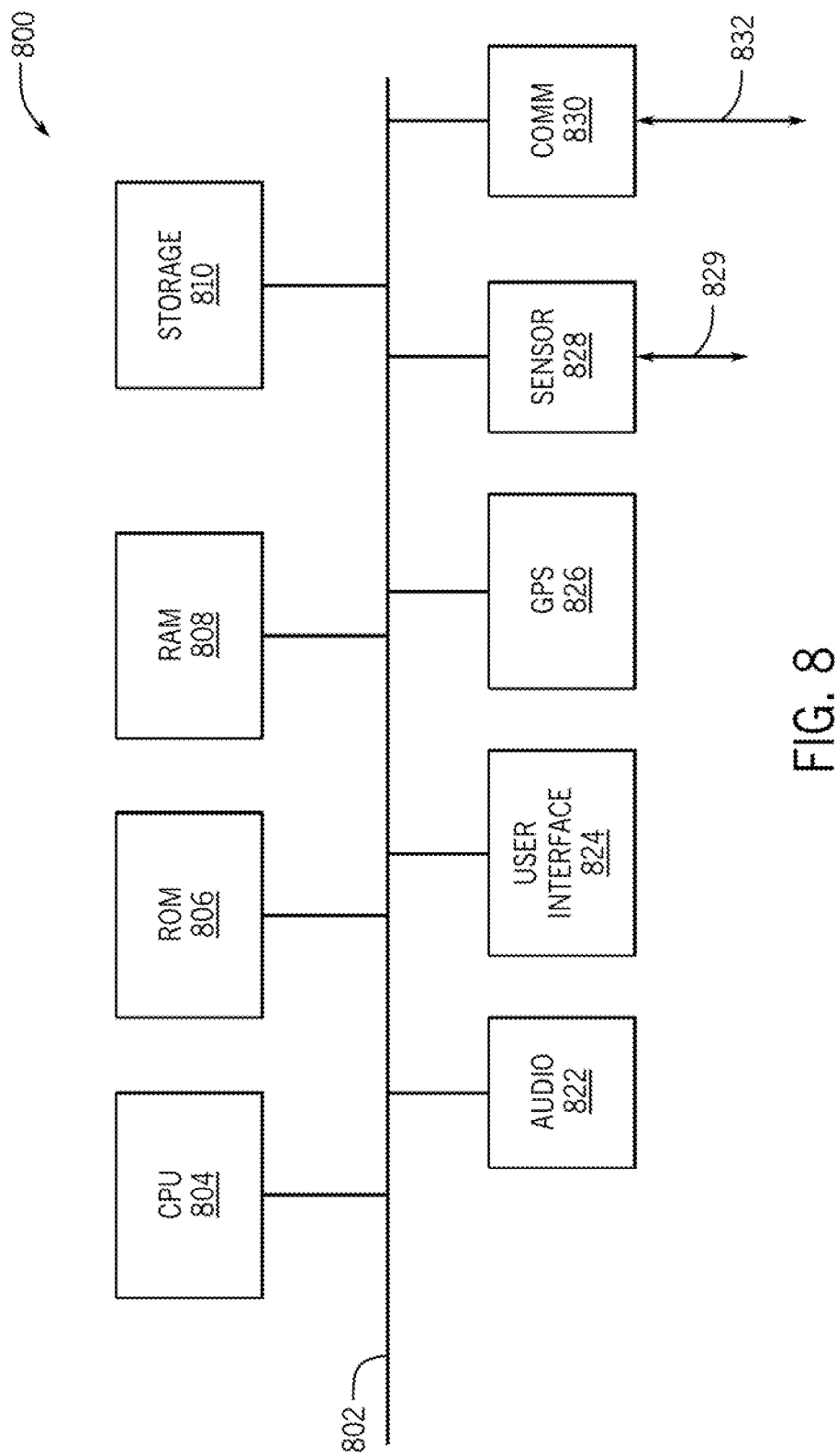
FIG. 8 illustrates a block diagram of a temple insert module, according to embodiments of the invention.

FIG. 8 illustrates, generally at 800, a block diagram of a temple insert module (TIM), according to embodiments of the invention. With reference to FIG. 8, as used in this description of embodiments, a TIM can be based on a device such as a computer, in which embodiments of the invention may be used. The block diagram is a high-level conceptual representation and may be implemented in a variety of ways and by various architectures. Bus system 802 interconnects a Central Processing Unit (CPU) 804 (alternatively referred to herein as a processor), Read Only Memory (ROM) 806, Random Access Memory (RAM) 808, storage 810, audio 822, user interface 824, and communications 830. RAM 808 can also represent dynamic random-access memory (DRAM) or other forms of memory. The user interface 824 can be in various embodiments a voice interface, a touch interface, a physical button, or combinations thereof. It is understood that memory (not shown) can be included with the CPU block 804. The bus system 802 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 994 (FireWire), Universal Serial Bus (USB), universal asynchronous receiver-transmitter (UART), serial peripheral interface (SPI), inter-integrated circuit (I2C), etc. The CPU 804 may be a single, multiple, or even a distributed computing resource. Storage 810 may be flash memory, etc. Note that depending upon the actual implementation of a TIM, the TIM may include some, all, more, or a rearrangement of components in the block diagram. Thus, many variations on the system of FIG. 8 are possible.

Connection with one or more wireless networks 832 is obtained via communication (COMM) 830, which enables the TIM 800 to communicate wirelessly with local sensors, local devices, as well as with remote devices on remote networks. In some embodiments, 832/830 provide access to remote voice-to-text conversion systems which can be in remote locations for example cloud based. 832 and 830 flexibly represent wireless communication systems in various implementations, and can represent various forms of telemetry, general packet radio service (GPRS), Ethernet, Wide Area Network (WAN), Local Area Network (LAN). Internet connection, Wi-Fi, WiMAX, ZigBee, Infrared, Bluetooth, near-field communications, mobile telephone communications systems, such as 3G, 4G, LTE, 5G, etc. and combinations thereof. In various embodiments, a touch interface is optionally provided at 824. Signals from one or more sensors are input to the system via 829 and 828. Global position system (GPS) information is received and is input to the system at 826. Audio can represent a speaker such as a projection speaker or projection micro-speaker described herein.

In various embodiments, depending on the hardware configuration different wireless protocols are used in the networks to provide the systems described in the figures above. One non-limiting embodiment of a technology used for wireless signal transmission is the Bluetooth wireless technology standard which is also commonly known as IEEE 802.15.1 standard. In other embodiments, the wireless signal transmission protocol known as Wi-Fi is used which uses the IEEE 802.11 standard. In other embodiments, the ZigBee communication protocol is used which is based on the IEEE 802.15.4 standard. These examples are given merely for illustration and do not limit different embodiments. Transmission Control Protocol (TCP) and Internet Protocol (IP) are also used with different embodiments. Embodiments are not limited by the data communication protocols listed herein and are readily used with other data communication protocols not specifically listed herein.

Figure 9:
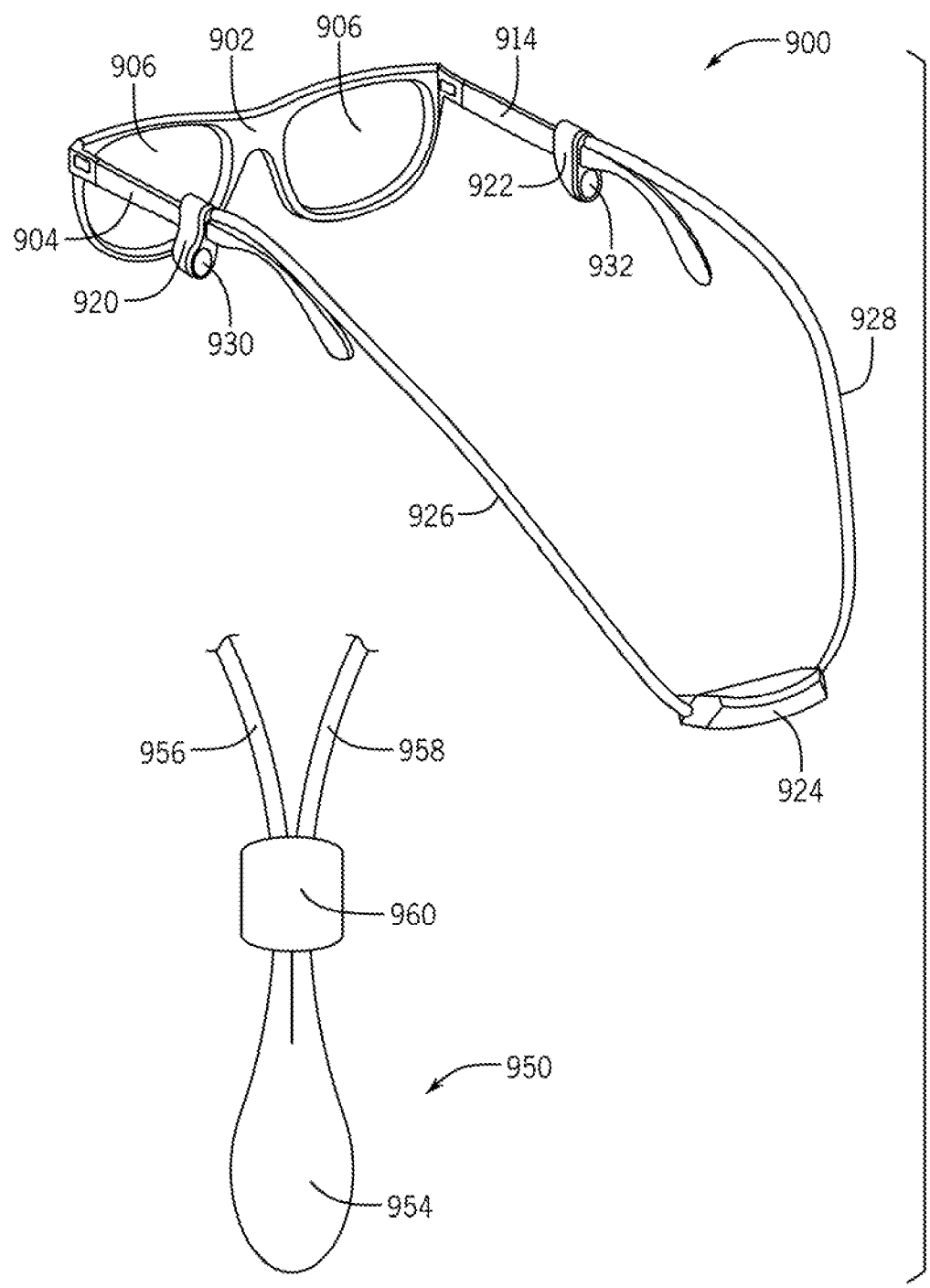
FIG. 9 illustrates a modularized eyewear device fitted with a behind the neck module assembly, according to embodiments of the invention.

In various embodiments, the components of systems as well as the systems described in the previous figures (such as a temple insert module (TIM)) are implemented in an integrated circuit device, which may include an integrated circuit package containing the integrated circuit. In some embodiments, the components of systems as well as the systems are implemented in a single integrated circuit die. In other embodiments, the components of systems as well as the systems are implemented in more than one integrated circuit die of an integrated circuit device which may include a multi-chip package containing the integrated circuit FIG. 9 illustrates a modularized eyewear device fitted with a behind the neck module assembly, according to embodiments of the invention. With reference to FIG. 9, at 900, a behind the neck module assembly is fitted to a passive set of eyewear. Passive eyewear indicates that there are no electronics located in the eyewear. Alternatively, the eyewear can be active or powered eyewear, as described herein, configured with electronics packaged into one or more temples or temple insert modules (TIMs). The eyewear has a frame chassis 902 that contains lens 906. Coupled to the frame chassis 902 is a left temple 904 and a right temple 914. The behind the neck module assembly includes a behind the neck electronics pod (ePOD) 924, a left temple interlock 920 a right temple interlock 922, a left smart cord 926 and a right smart cord 928. The left smart cord 926 couples electrically and mechanically the ePOD 924 to the left temple interlock 920 and the right smart cord couples electrically and mechanically the ePOD 924 to the right temple interlock 922.

The left temple interlock 920 contains an acoustic cavity, an audio speaker, and an acoustic port. The acoustic port for the left audio speaker is indicated at 930. The left smart cord 926 contains electrical conductors that provide an audio signal for the audio speaker contained within the left temple interlock 920. In one or more embodiments, the audio speaker contained in the left temple interlock is a microprojection speaker. Similarly, the acoustic port for the right audio speaker is indicated at 932. The right smart cord 928 contains electrical conductors that provide an audio signal for the audio speaker contained within the right temple interlock 922. In one or more embodiments, the audio speaker contained in the right temple interlock is a microprojection speaker In various embodiments, the ePOD 924 contains an electronics unit. The electronics unit contains the electronic components and functionality described herein for a temple insert module (TIM). In other words, the electronics unit is a TIM mechanically and electrically packaged for use in a behind the neck module assembly.

Electronics units having different electronic configuration and functionality can be swapped in and out of the ePOD in similar fashion to the way different TIMs are swapped into and out of a temple of an eyewear device.

At 950 a length adjustment is provided to shorten or lengthen the right smart cord and the left smart cord. A behind the neck electronics pod (ePOD) 954 is configured with a left smart cord 956 and a right smart cord 958 exiting the same end of the ePOD 954. Such a configuration of the smart cords 956 and 958 permit a slider 960 to move either away from the ePOD or toward the ePOD. Moving the slider 960 away from the ePOD 954 shortens the available free length of the smart cords 965/958. Moving the slider 960 towards the ePOD 954 increases the available free length of smart cords 956/958.

In one or more embodiments, in operation when in an "on" state, audio data is streamed to the electronics unit in the ePOD 924 and is directed to the left and right speakers for broadcast to a user when the behind the neck module assembly is installed on an eyewear device and the user wears the eyewear device.

Figure 10:
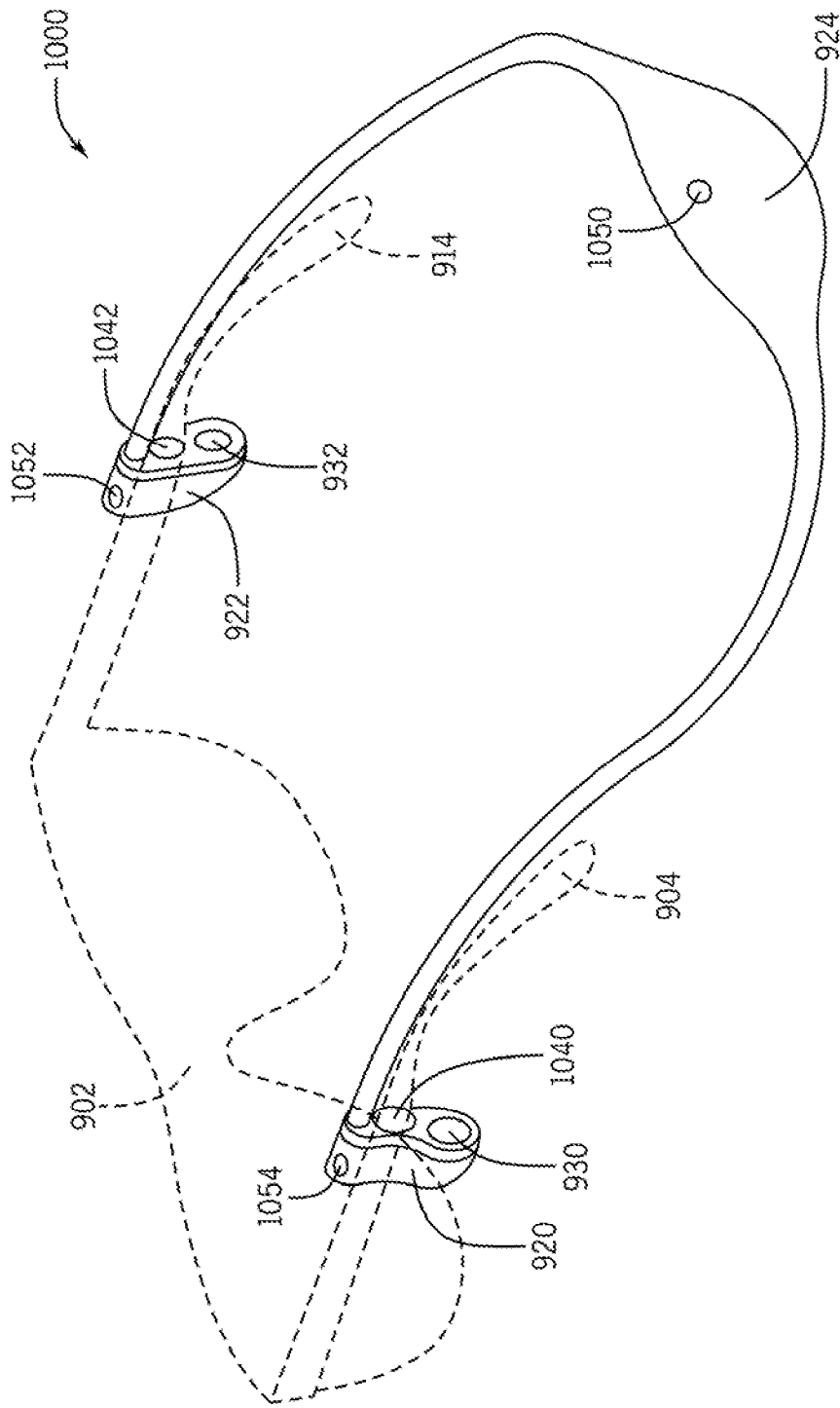
FIG. 10 illustrates a behind the neck module assembly in perspective view configured with a wearable device, according to embodiments of the invention.

FIG. 10 illustrates, generally at 1000, a behind the neck module assembly in perspective view configured with a wearable device, according to embodiments of the invention. With reference to FIG. 10, a first sensor 1050 is illustrated on the ePOD 924. A second sensor 1052 is illustrated incorporated into the right temple interlock 922. A third sensor 1054 is illustrated incorporated into the left temple interlock 920. The sensors 1050, 1052, and 1054 can be any of the sensors described herein previously described for use in a TIM or directly in electronics built into a temple.

In the embodiment shown in FIG. 10, each temple interlock module, i.e., 920 and 922 contains a through hole into which a temple of the eyewear is inserted. In this embodiment, the temple interlock modules 920 and 922 are made from a compliant material such as an elastomer or rubber that permits elongation sufficient for a temple to be inserted therethrough. For example, the left temple interlock 920 contains a through hole 1040 into which the left temple 904 is inserted. The right temple interlock 922 contains a through hole 1042 into which the right temple 914 is inserted. Each of the temple interlocks 920 and 922 are positioned on a pair of compatible eyewear such that each of the speaker ports 930 and 932 are positioned in front of and near to a user's ear. Compatible eyewear is eyewear that is compatible with the mechanical attachment provided by the temple interlocks.

Figure 11:
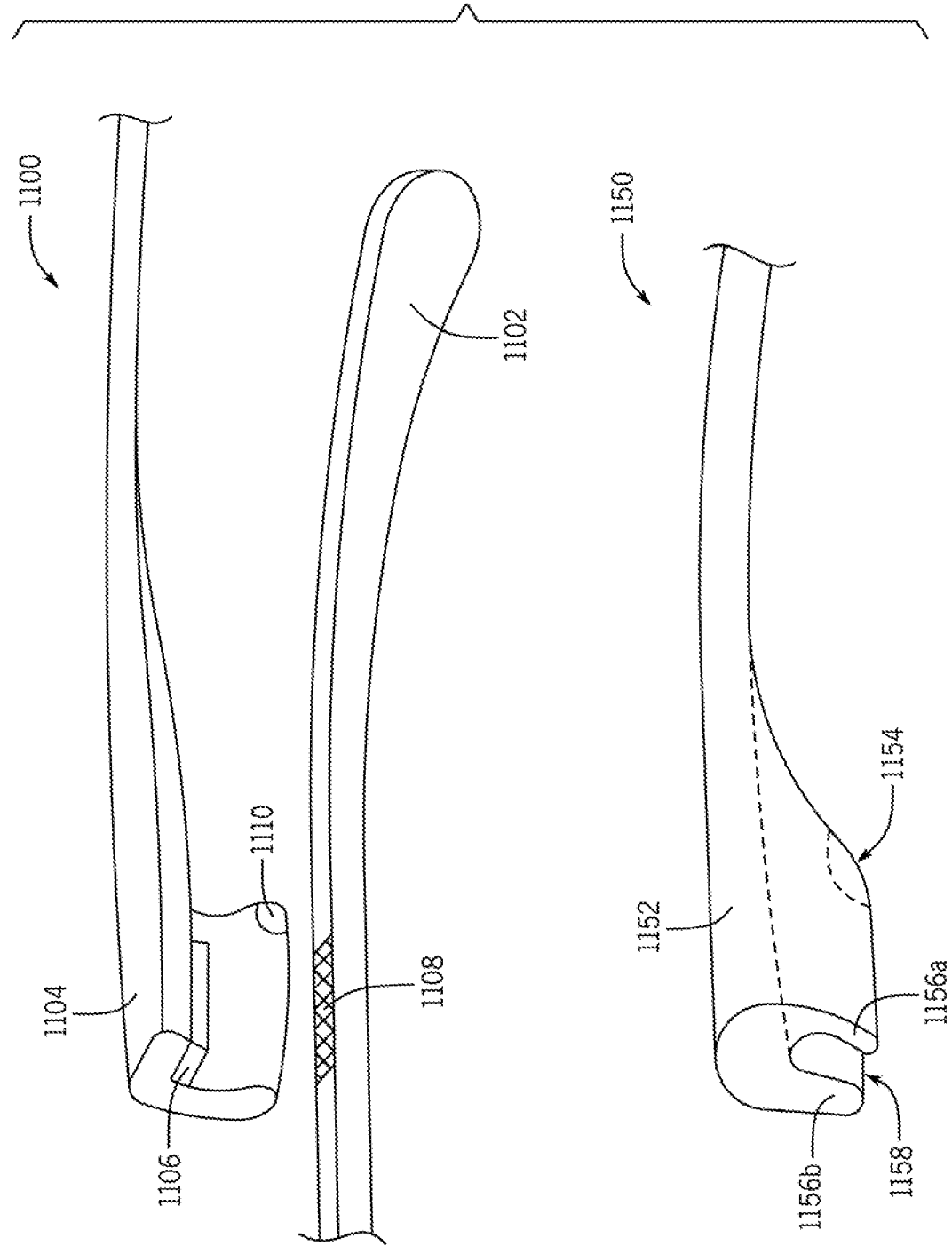
FIG. 11 illustrates coupling a temple interlock to a temple according to embodiments of the invention.

FIG. 11 illustrates, generally at 1100 and 1150, coupling a temple interlock to a temple according to embodiments of the invention. With reference to FIG. 11, at 1100 a magnetic temple interlock is illustrated. The magnetic temple interlock includes a magnetic region 1108 on a temple 1102 of an eyewear device. A temple interlock 1104 has a corresponding magnetic region 1106. In operation, the magnetic regions 1106 and 1108 are brought together, thereby causing the magnetic regions 1106 and 1108 to attract each other which provides a clamping force between the temple interlock 1104 and the temple 1102. A port of an acoustic cavity that contains a speaker is illustrated at 1110.

Another method of clamping is illustrated at 1150. A temple interlock 1152 contains a slot 1158 between a first side 1156a and a second side 1156b of compliant material. The geometry of 1158, 1156a, and 1156b forms a U shape into which a temple of an eyewear device can be inserted. The elasticity of the material 1152 provides a releasable coupling between the temple interlock 1152 and the temple of the eyewear (not shown). An acoustic port of an acoustic cavity that houses a speaker is indicated at 1154.

Figure 12:
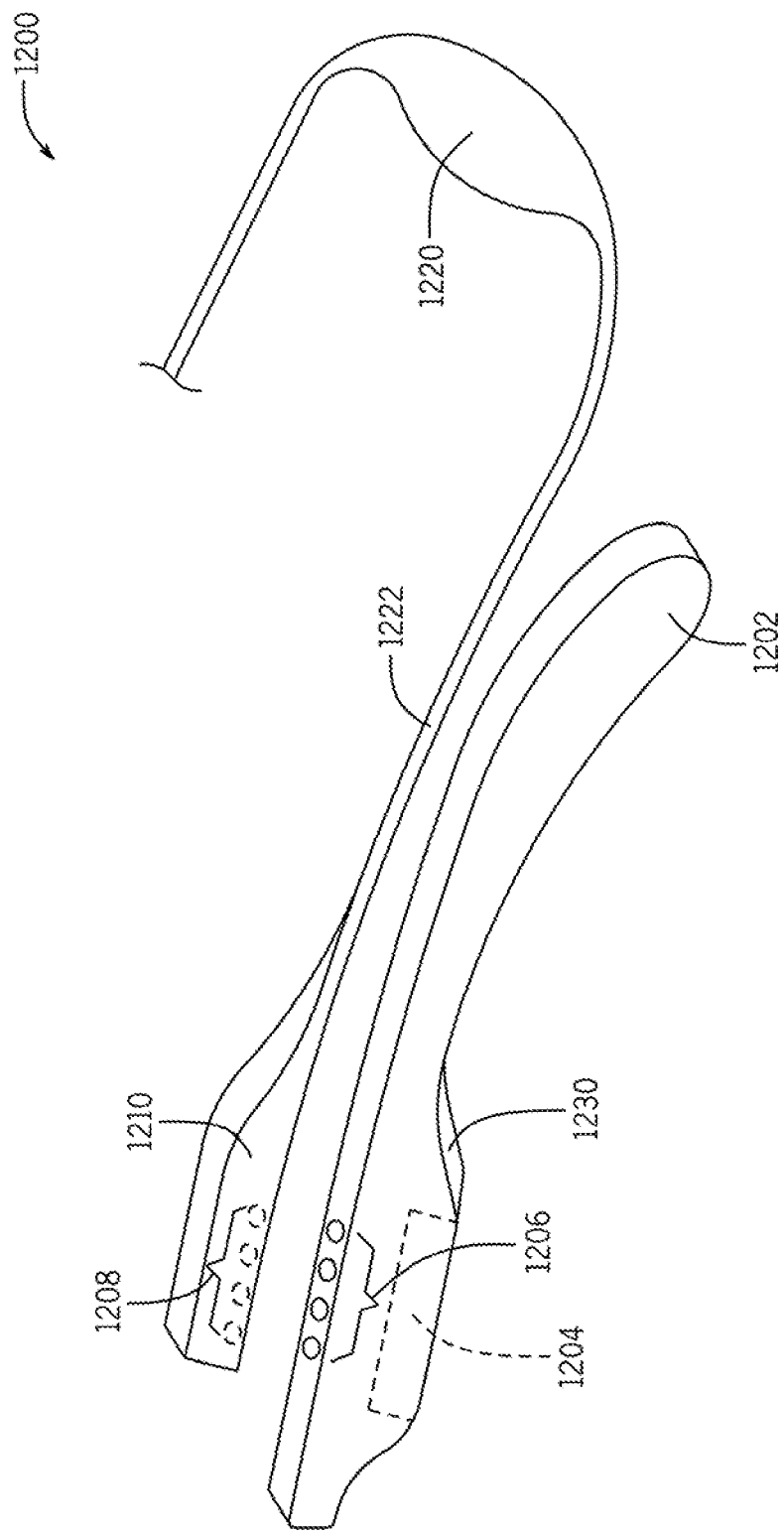
FIG. 12 illustrates coupling a behind the neck module to electronics contained within a temple, according to embodiments of the invention.

FIG. 12 illustrates, generally at 1200, coupling a behind the neck module to electronics contained within a temple, according to embodiments of the invention. With reference to FIG. 12, a behind the neck module assembly is coupled to electronics contained within a temple. A portion of a behind the neck module assembly is illustrated with a behind the neck electronics pod (ePOD) 1220, a left smart cord 1222, and a left temple interlock 1210. Any of the electronics contained with a temple, as previously described, can be contained directly within a temple without a temple insert module (TIM). Or alternatively, the electronics contained with the temple can be electronics that are part of a TIM, as indicated optionally at 1204. In either situation, a temple 1202 is provided with a number of electrical contacts indicated at 1206. A corresponding number of electrical contacts 1208 are provided in the left temple interlock 1210. A mechanical interlock between the temple 1202 and the left temple interlock 1210 is provided to make the connection between 1210 and 1202 releasably couplable. In one or more embodiments a magnetic coupling is provided near or at the location of 1206/1208 to provide a releasable coupling thereto.

Figure 13:
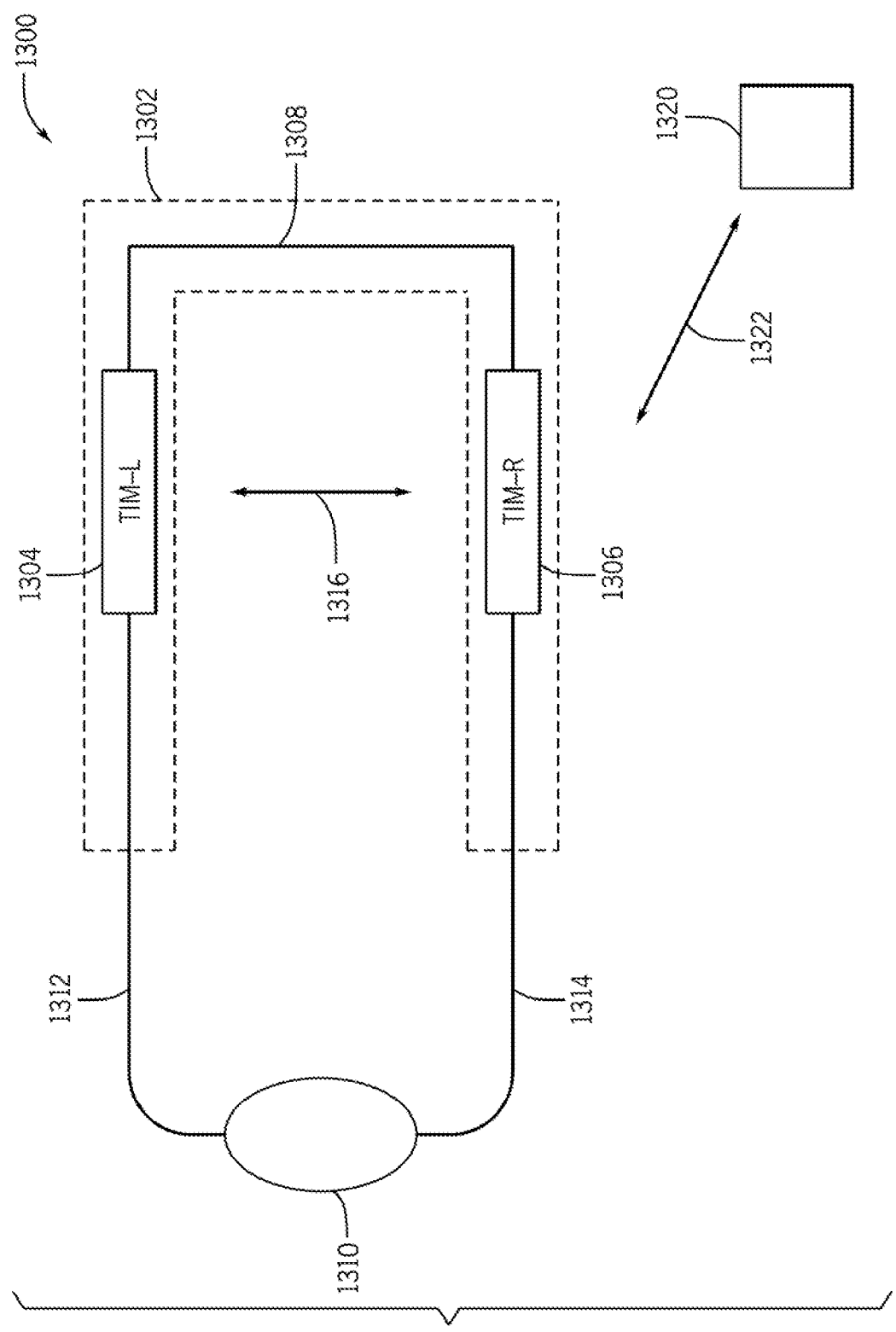
FIG. 13 illustrates a schematic for combining a behind the neck module assembly with temple electronics, according to embodiments of the invention.

FIG. 13 illustrates, generally at 1300, a schematic for combining a behind the neck module assembly with temple electronics, according to embodiments of the invention. With reference to FIG. 13, an outline of an eyewear device is indicated at 1302. The eyewear device 1302 contains electronics and or electronic pathways in a left temple, a right temple, and a frame chassis. The outline 1302 encompasses the frame chassis, left temple, and right temple. In the system depicted in the figure, an electronics path 1308 extends between the left temple and the right temple of the eyewear device 1302.

The eyewear device contains a left temple insert module (TIM) 1304 located in a left temple and a right TIM 1306 located in a right temple. A behind the neck module assembly with electronics unit (ePOD) is indicated at 1310. A left smart cord 1312 provides an electrical pathway between the ePOD 1310 and the left TIM 1304. A right smart cord 1314 provides an electrical pathway between the ePOD 1310 and the right TIM 1306. In various embodiments both the left TIM 1304 and the right TIM 1306 are configured with one or more wireless communication network systems that permit wireless communication between the left TIM 1304 and the right TIM 1306 as indicated at 1316. A remote device 1320 is representative of one or more wireless sensors or wireless user devices as described above in conjunction with the preceding figures. Wireless communication 1322 is accomplished between the remote device 1320 and at least one of the left TIM 1304, the right TIM 1306, and the ePOD 1310. All of the electronic system functionality described above with respect to a TIM is applicable to an ePOD such as ePOD 1310.

In some embodiments, a left temple is not electrically connected to a right temple, in such as case the electrical path 1308 is removed from the electrical schematic shown in 1300.

Figure 14:
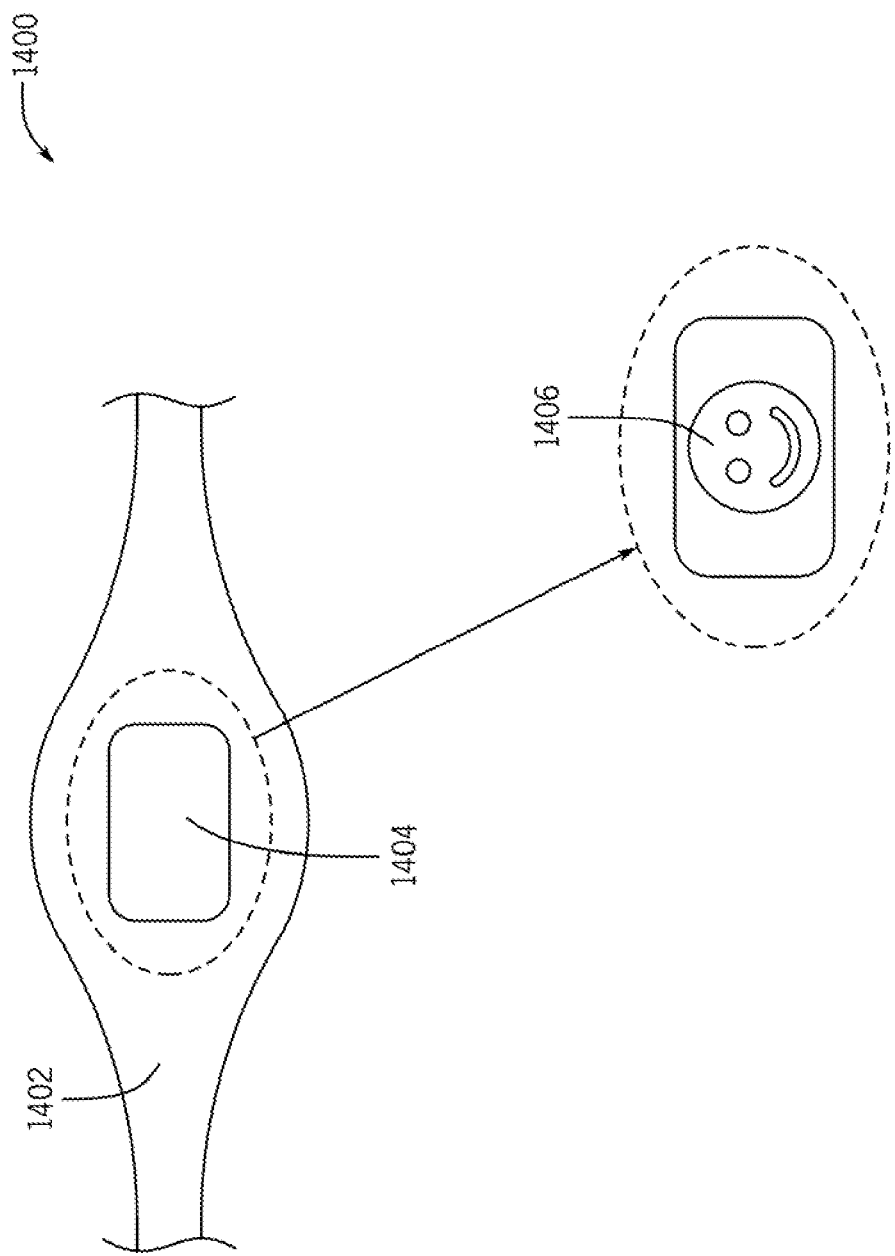
FIG. 14 illustrates a user interface on a behind the neck module assembly, according to embodiments of the invention.

FIG. 14 illustrates, generally at 1400, a user interface on a behind the neck module assembly, according to embodiments of the invention. With reference to FIG. 14, a behind the neck electronics pod (ePOD) is illustrated at 1402. The ePOD 1402 has a display interface 1404. The display interface 1404 can be implemented in various ways in different embodiments. In some embodiments the user interface is a tactile surface button. In some embodiments, the user interface is implemented with a touch screen, such as a capacitive touch screen presenting one or more controls to a user. In some embodiments, the user interface communicates information to a user. In yet other embodiments, the user interface communicates information to a person who views the user interface 1404 from behind the user who is wearing the ePOD 1402. An example of such information is, but is not limited to, an emoji, mood status, icon, etc. as indicated at 1406.

Figure 15:
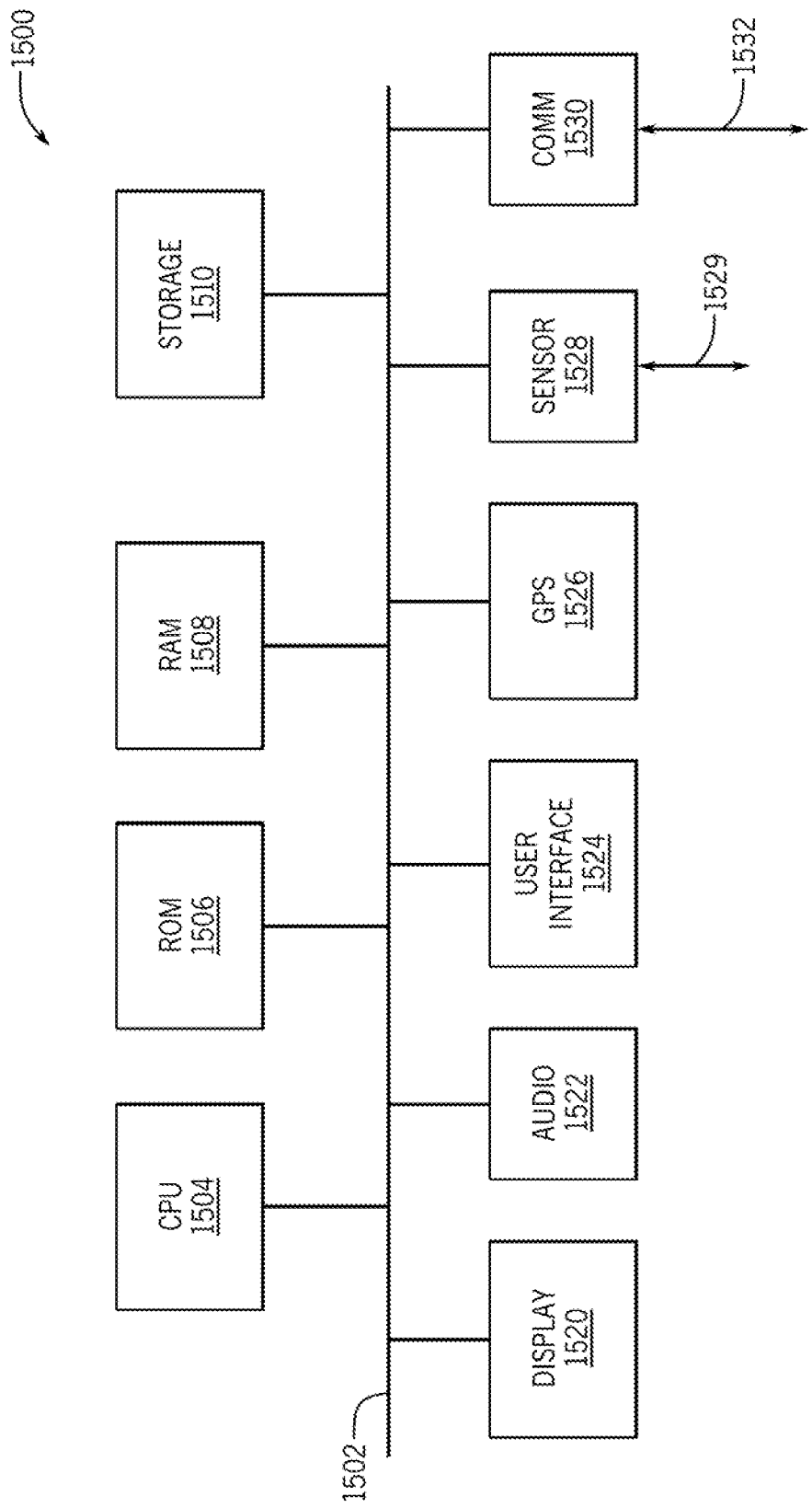
FIG. 15 illustrates a block diagram for a behind the neck electronics unit, according to embodiments of the invention.

FIG. 15 illustrates, generally at 1500, a block diagram for a behind the neck electronics unit, according to embodiments of the invention. With reference to FIG. 15, as used in this description of embodiments, a behind the neck electronics unit can be based on a device such as a computer, in which embodiments of the invention may be used. The block diagram is a high-level conceptual representation and may be implemented in a variety of ways and by various architectures. Bus system 1502 interconnects a Central Processing Unit (CPU) 1504 (alternatively referred to herein as a processor), Read Only Memory (ROM) 1506, Random Access Memory (RAM) 1508, storage 1510, audio 1522, user interface 1524, and communications 1530. RAM 1508 can also represent dynamic random-access memory (DRAM) or other forms of memory. The user interface 1524 can be in various embodiments a voice interface, a touch interface, a physical button, or combinations thereof. It is understood that memory (not shown) can be included with the CPU block 1504. The bus system 1502 may be for example, one or more of such buses as a system bus, Peripheral Component Interconnect (PCI), Advanced Graphics Port (AGP), Small Computer System Interface (SCSI), Institute of Electrical and Electronics Engineers (iEEE) standard number 994 (FireWire), Universal Serial Bus (USB), universal asynchronous receiver-transmitter (UART), serial peripheral interface (SPI), inter-integrated circuit (I2C), etc. The CPU 1504 may be a single, multiple, or even a distributed computing resource. Storage 1510 may be flash memory, etc. Note that depending upon the actual implementation of a TIM, the TIM may include some, all, more, or a rearrangement of components in the block diagram. Thus, many variations on the system of FIG. 15 are possible.

Connection with one or more wireless networks 1532 is obtained via communication (COMM) 1530, which enables the TIM 1500 to communicate wirelessly with local sensors, local devices, as well as with remote devices on remote networks. In some embodiments, 1532/1530 provide access to remote voice-to-text conversion systems which can be in remote locations for example cloud based. 1532 and 1530 flexibly represent wireless communication systems in various implementations, and can represent various forms of telemetry, general packet radio service (GPRS), Ethernet, Wide Area Network (WAN), Local Area Network (LAN), Internet connection, Wi-Fi, WiMAX, ZigBee, Infrared, Bluetooth, near-field communications, mobile telephone communications systems, such as 3G, 4G, LTE, 5G, etc. and combinations thereof. In various embodiments, a touch interface is optionally provided at 1524. An optional display is provided at 1520. Signals from one or more sensors are input to the system via 1529 and 1528. Global position system (GPS) information is received and is input to the system at 1526. Audio can represent a speaker such as a projection speaker or projection micro-speaker described herein.

In various embodiments, depending on the hardware configuration different wireless protocols are used in the networks to provide the systems described in the figures above. One non-limiting embodiment of a technology used for wireless signal transmission is the Bluetooth wireless technology standard which is also commonly known as IEEE 802.15.1 standard. In other embodiments, the wireless signal transmission protocol known as Wi-Fi is used which uses the IEEE 802.11 standard. In other embodiments, the ZigBee communication protocol is used which is based on the IEEE 802.15.4 standard. These examples are given merely for illustration and do not limit different embodiments. Transmission Control Protocol (TCP) and Internet Protocol (IP) are also used with different embodiments. Embodiments are not limited by the data communication protocols listed herein and are readily used with other data communication protocols not specifically listed herein.

In various embodiments, the components of systems as well as the systems described in the previous figures (such as a behind the neck electronics unit) are implemented in an integrated circuit device, which may include an integrated circuit package containing the integrated circuit. In some embodiments, the components of systems as well as the systems are implemented in a single integrated circuit die. In other embodiments, the components of systems as well as the systems are implemented in more than one integrated circuit die of an integrated circuit device which may include a multi-chip package containing the integrated circuit In various embodiments, the descriptions of embodiments provided herein provide reconfigurable components for head wearable devices. Reconfigurable components for head wearable devices include, but are not limited to, removable temples, removable temple insert modules (TIMs), a behind the neck module assembly, an electronics pod ePOD for a behind the neck module assembly and removable electronics units for ePODs.

Figure 16:
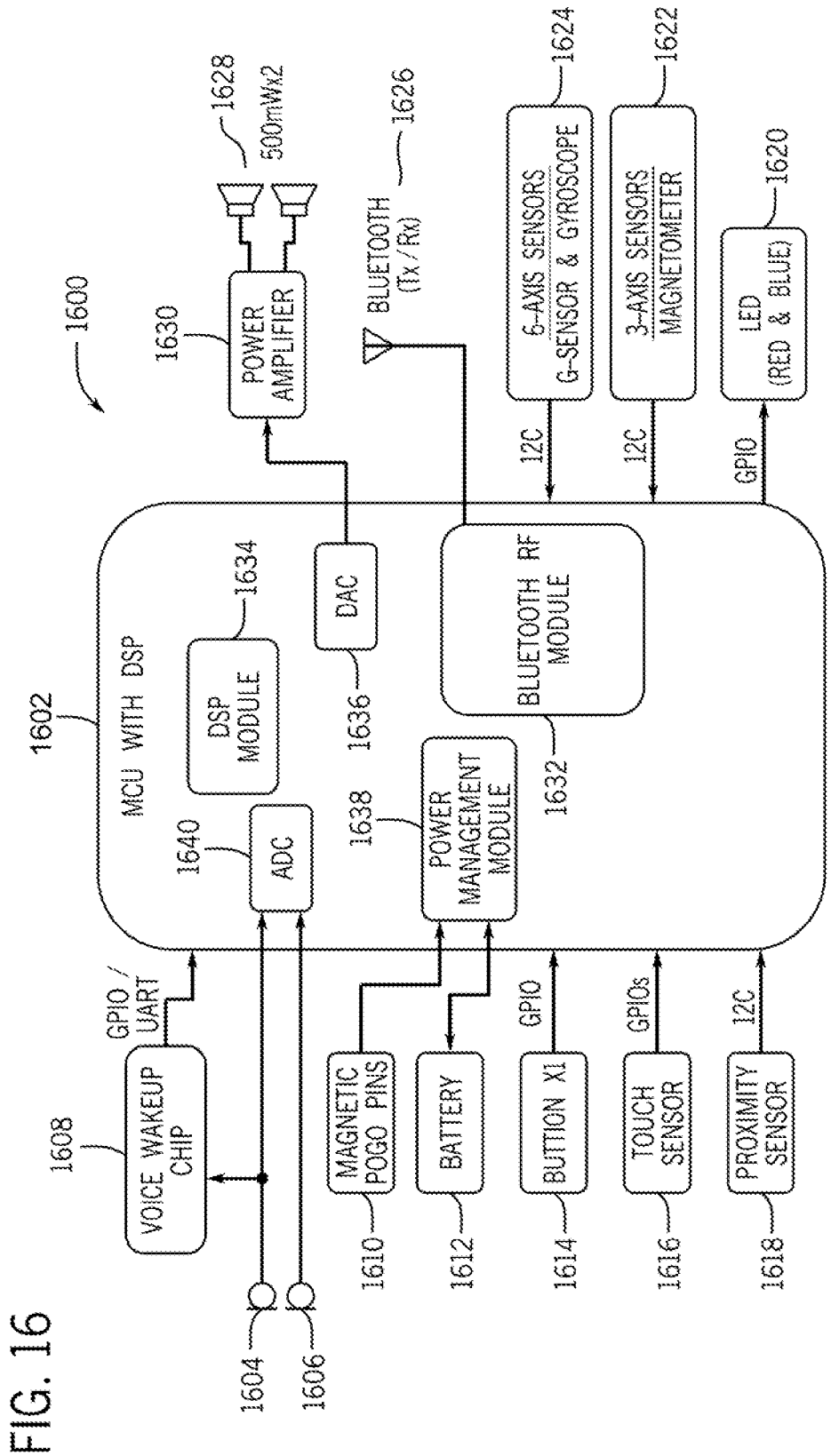
FIG. 16 illustrates a schematic a schematic block diagram, according to embodiments of the invention.

FIG. 16 illustrates, generally at 1600, a schematic block diagram of system architecture, according to embodiments of the invention. With reference to FIG. 16, embodiments of the invention are used in a system architecture that is customized for head wearable devices, such as, but not limited to, smart glasses or other eye-wear devices or head wearable devices. The system architecture described in conjunction with figures below is used in conjunction with the reconfigurable components for head wearable devices described above that include, but are not limited to; removable temples, removable temple insert modules (TIMs), a behind the neck module assembly, an electronics pod ePOD for a behind the neck module assembly, and removable electronics units for ePODs, etc.

With reference to FIG. 16, a mobile communications unit (MCU), an MCU with a digital signal processor (DSP) are illustrated in various embodiments in FIG. 16 at 1602. The system 1600, in various embodiments, includes one or more of the following sub-blocks:

Central Processing Unit (CPU)+DSP chip 1634.
Voice wake-up chip 1608.
Universal Serial Bus (USB) type A magnetic pogo pin connector 1610 for battery charging and signal paths to a computer or a mobile device.
A multi-functional button 1614.
A bi-color light source, such as a light emitting diode (LED) (For example RED and BLUE color) 1620.
Stereo power amplifier 1630 to drive 2 speakers 1628.
Two microphones 1604/1606.
Sensors:
  Touch sensor 1616.
  Proximity sensor 1618.
    6-axis sensor (3 axis accelerometer+3 axis gyroscope) 1622.
    3-axis magnetometer 1620.

In some embodiments, the core of the hardware architecture is a single chip with CPU, digital signal processor, and Bluetooth RF modules inside the device. CPU and DSP (1634) can be a separate chip or can be integrated into a single chip. In some embodiments, an integration of the DSP into the CPU is adopted to reduce cost. Note that the list of sub-blocks above is given merely for illustration and that embodiments of the invention may contains more sub-blocks or fewer sub-blocks than those listed above. The interfaces shown herein, such as, general purpose input-output (GPIO), I-squared-c (I2C), Universal Asynchronous Receiver/Transmitter (UART), etc. are shown by way of example and do not limit embodiments of the invention. Embodiments of the invention are readily implemented with different interface and bus standards.

Tasks for the CPU include task scheduling, GPIO control, sensor control data capture and manipulation, Bluetooth Radio Frequency (RF) management and power management. IN various embodiments, the DSP handles signal processing tasks such as noise cancellation, acoustic echo cancellation, cross-talk correction, and all time consuming signal processing algorithms. Bluetooth (BT) RF module 1632 handles BT wireless communication protocols. In some embodiments, in addition to the Bluetooth module 1632, a cellular communications module is added to provide direct cellular telephone communications from the system 1600 embedded into a head wearable device. In other embodiments, the Bluetooth module 1632 is replaced by a cellular communications module. Thus, many different configurations of wireless communications are possible with the system 1600. The system 1600 can be configured with various sensors, such as those listed below. Those of ordinary skill in the art will recognize that a system 1600 can be configured with additional sensors or fewer sensors than those shown in the list below:

LED 1620—via GPIO output pin.
Button 1614—via GPIO input pin.
Touch sensor 166—via GPIOs input and output pins.
Voice wake-up chip 1608—via GPIO and UART.
Proximity sensor 1618—via I2C bus.
Microphone 1604/1606 & speaker 1628—via analog-digital-converter (ADC) 1640 and digital-to-analog-converter (DAC) 1636.
6+3 axis sensors—via I2C bus.

Figure 17:
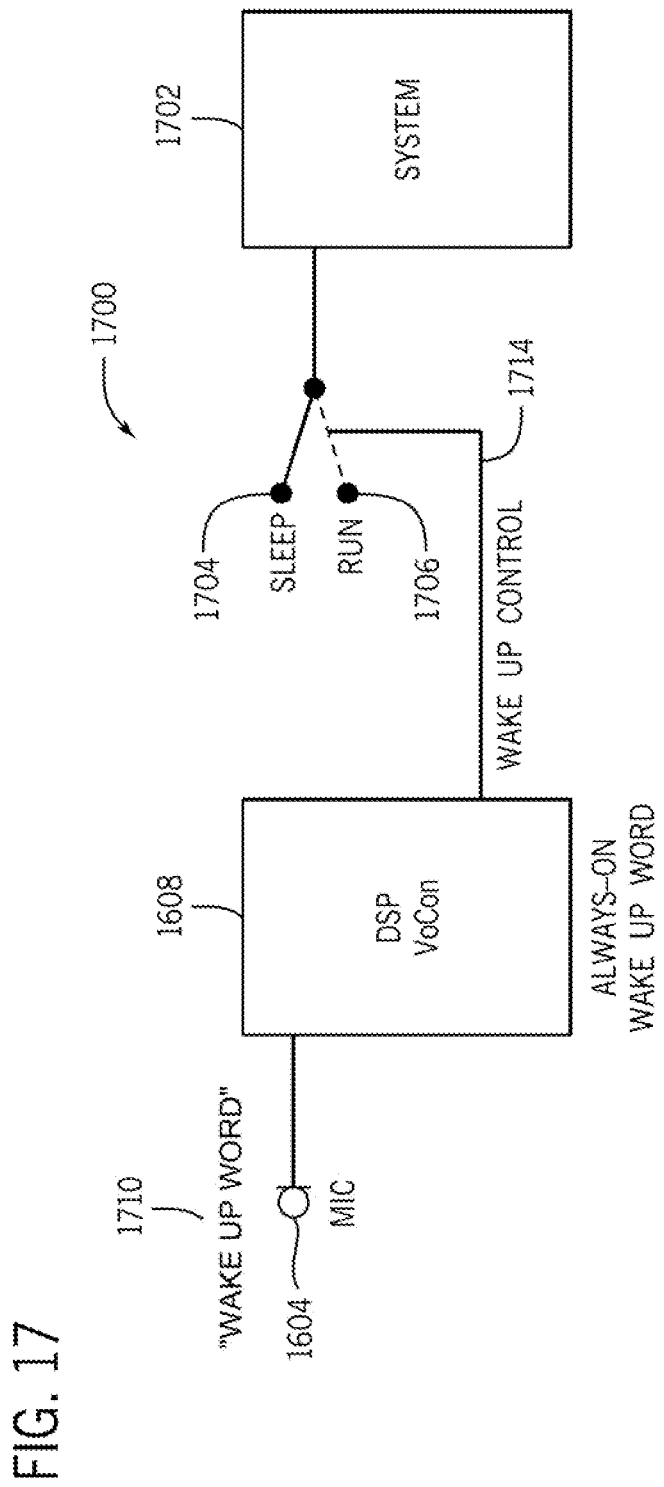
FIG. 17 illustrates a schematic a schematic block diagram for wakeup control, according to embodiments of the invention.

FIG. 17 illustrates a schematic block diagram for wakeup control, according to embodiments of the invention. Referring to FIG. 17, the system 1702 will enter sleep mode 1704 in order to save battery power. A voice wake-up chip, such as for example 1608, is used to detect a wake-up word 1710 (for example "SOLOS" spoken by a user and received on a microphone such as 1604). If the wake-up word 1710 is detected at 1608, the CPU/System is powered up and moves to a "RUN" state as indicated at 1706.

The systems 1700, 1702 or 1600 illustrated in conjunction with FIG. 16 and FIG. 17, utilize an embedded speech recognition system 1608. Examples, of embedded speech recognition systems for use in embodiments of the invention are, but are not limited to, the embedded speech recognition systems from NUANCE such as the VoCon Hybrid, etc. or embedded speech recognition systems from other manufacturers. The data sheet for the NUANCE VoCon Hybrid is included herein as APPENDIX 1.

Referring to FIG. 16 and FIG. 17, in operation, when idle, the System 1702 is in "SLEEP" mode whereas the DSP VoCon 1608 is always "ON" so that it can detect the wake-up word 1710 via an input from the connected microphone 1604. When the DSP VoCon system 1608 detects the wake-up word 1710, a wakeup control signal 1714 is sent to move the System 1702 from "SLEEP" mode 1704 to "RUN" mode 1706.

The embedded speech recognition system 1608 is used to process wake-up word(s) 1710 and it is also used for command and control of the head wearable device from commands extracted from a user's speech.

In various embodiments, the components of system shown in FIG. 16 and/or FIG. 17 are implemented in an integrated circuit device, which may include an integrated circuit package containing the integrated circuit. In some embodiments, the components of the system(s) are implemented in a single integrated circuit die. In other embodiments, the components of the system(s) are implemented in more than one integrated circuit die of an integrated circuit device which may include a multi-chip package containing the integrated circuit.

In various embodiments, six (6) axis sensors, illustrated at 1624, and three (3) axis sensors, illustrated at 1622, are used to perform heading, tracking, and e-compass functions. In one embodiment, provided merely tor illustration and with no limitation implied thereby, the sensors capture the following nine (9) axis data (at rate of 10 samples/second) which can be used by a mobile communications unit (MCU) 1602 to calculate movement of a user's head. The nine (9) axes of data are, but are not limited to: acceleration data measured from accelerometers along X, Y, and Z axes; gyroscope data from X, Y, and Z axes; and magnetometer data from X, Y, and Z axes. It is understood by those of ordinary skill in the art that X. Y, and Z axes imply an orthogonal coordinate system. In some embodiments, these sensor data are used to track the trajectory of user's movement while wearing a head wearable device.

Figure 18:
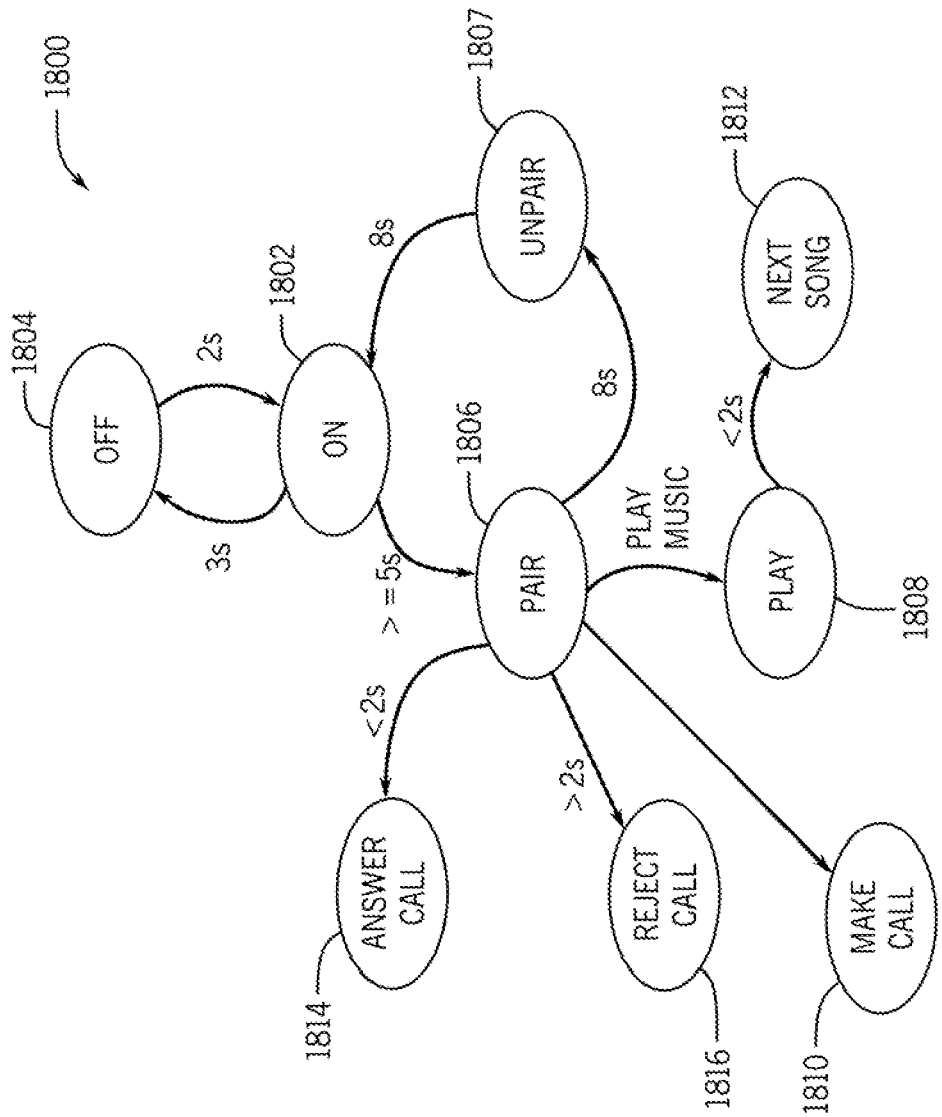
FIG. 18 illustrates a state diagram for button operation, according to embodiments of the invention.

FIG. 18 illustrates, generally at 1800, a state diagram for button operation, according to embodiments of the invention. A button, such as 1614 in FIG. 16, is designed to support multiple purpose functionality. In one or more embodiments, the descriptions of the functions supported by a single button, a touch slider, and a proximity sensor are illustrated by way of example. Other functionality can be provided by the button, touch sensor, and proximity sensor. Different numbers of buttons, sliders, and sensors can also be provided in various embodiments in order to provide the needed functionality for a given head wearable device. The functionality and state diagrams presented herein are provided merely by way of example and do not limit embodiments of the invention. Power ON/OFF Function 1802/1804 is illustrated as follows:

a) A power "ON" state at 1802 is entered with a short press of the "Power Button" for a predetermined time (in one or more embodiment the predetermined time is two (2) seconds) until an "ON" indication light is activated. In one or more embodiments, the "ON" indication light is a blue colored light, in the "ON" state 1802 a user can, through voice command ask the system what the battery power level is at. For example, a system can be configured to return battery power level quantized to different granularity. One example is a quantization to three (3) battery power levels, i.e, low, medium, high. Other quantizations are possible, and this example using three battery power levels is given merely for illustration with no limitation implied thereby. Alternatively, the system can be configured to notify the user of the current battery power level via machine generated audible voice message.

b) A power "OFF" state at 1804 is entered with a long press of the "Power Button" for a predetermined time (in one or more embodiment the predetermined time is three (3) seconds) until a an "OFF" indication light is activated. In one or more embodiments, the "OFF" indication light is a red colored light. The system can be configured to notify the user that the system is powering down to the "OFF" state via machine generated audible voice message.

The pairing/unpaired functions 1806/1807 with a device, such as a mobile phone, are illustrated as follows:

i. A press of the "Power Button" for a time longer than is required to move to the OFF state, results in "PAIRING" the system to a mobile device. For the purpose of the example given herein, 5 seconds is a suitable time to configure the system for "PAIRING," noting that 5 seconds is longer than the time (2 seconds) required to move the system to the OFF sate. Thus, in operation, a user depresses the "Power Button" until a blue colored light and a red colored light blink alternatively which will pair the system with a mobile device, indicated at 1806. After pairing, the system will play a machine generated voice prompt telling the user that pairing was successful. The system can be moved to the "UNPAIR" state at 1807 by depressing the power for a time longer than is required for pairing. Thus eight (8) seconds would accomplish moving the system to the "UNPAIR" state at 1807. Different times can be chosen and those predetermined times given herein are given merely for an example and do not limit embodiments of the invention.

ii. After pairing successfully, a user can play music at 1808 and make a phone call at 1810 utilizing a wireless connection between the head wearable device and a mobile phone or an MCU (generically referred to as a device). Head wearable devices, such as Smart Glasses will be turned off automatically after a preset time if the connection fails. In one embodiment, provided merely for example the preset time is three (3) minutes.

iii. When music is playing through the smart glasses at 1808, a short press of the button will advance to the next song at 1812. In one embodiment, provided merely for illustration, and with no limitation implied thereby, a short press of the button necessary to advance to the next song is less than two (2) seconds.

iv. When there is an incoming call during music playback or when in the idle state, a short press the button for less than a predetermined time will answer the call at 1814. For the purpose of illustration, and with no limitation implied thereby, a predetermined time for a short press of the button is less than 2 seconds. In case a user presses the button longer than the predetermined time, then the call is rejected at 1816.

Figure 19:
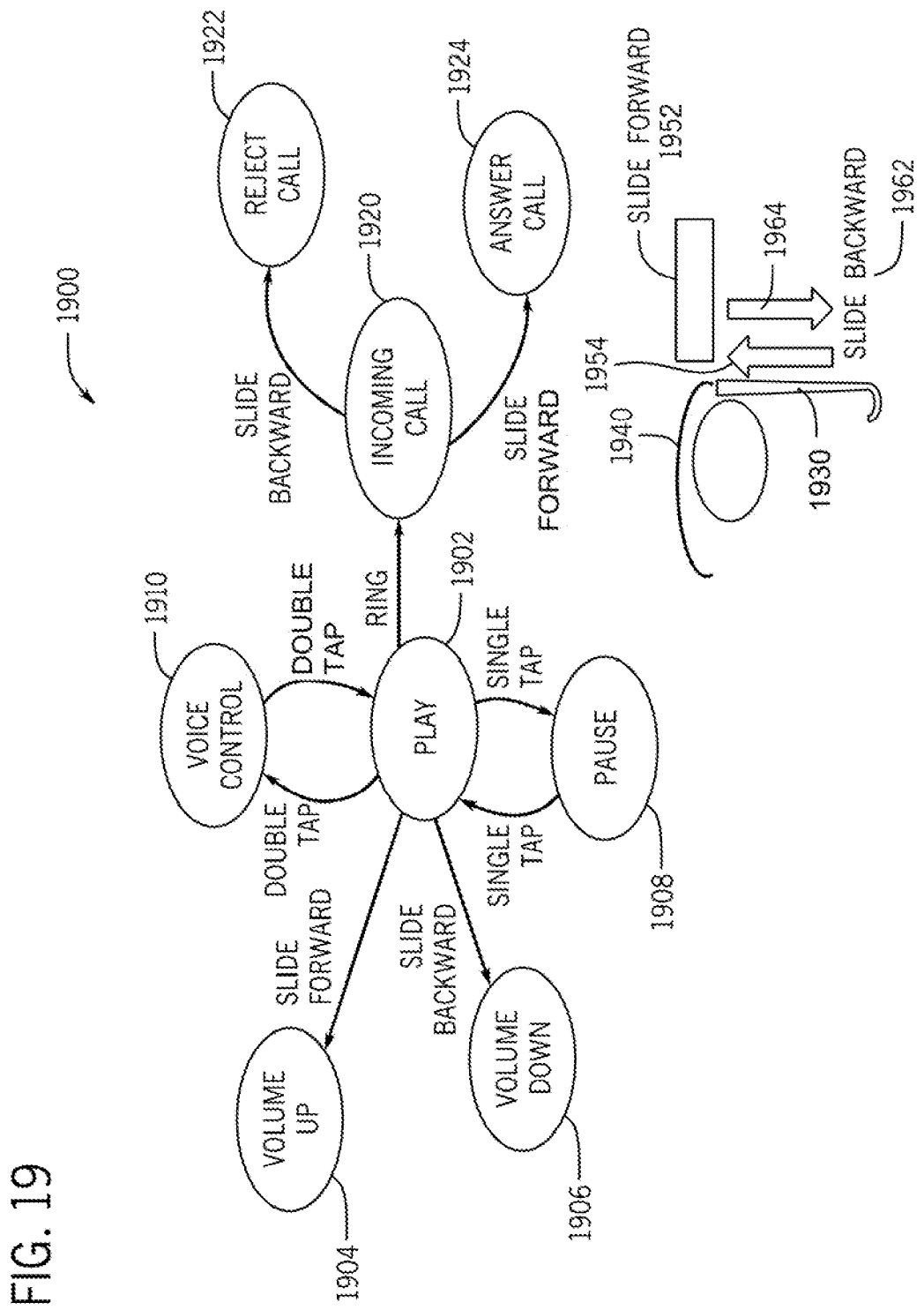
FIG. 19 illustrates a state diagram for touch sensor operation, according to embodiments of the invention.

FIG. 19 illustrates, generally at 1900, a state diagram for touch sensor operation, according to embodiments of the invention. In one or more embodiments, a touch sensor is configured with concurrent "slider" functionality and "tap" functionality. An example of a touch sensor is 1616 in FIG. 16.

In one or more embodiments, provided merely for example, and with no limitation implied thereby, a touch sensor supports two functions: touch slider, single tap and double tap operations. In other embodiments, a touch sensor can be configured to support more or less functionality than that of the sensor described herein. With reference to FIG. 19, a state diagram corresponding to touch sensor operations is illustrated. Volume control by slider 1930 is configured on an eyewear device 1940. The slider 1930 is configured to accept a "sliding" input registered by a user sliding a finger along the sensor region. In this example, the volume control has 8 levels (level 1 . . . level 8). A "quick slide" imparted to the touch slider results in an increase or a decrease in the volume by 1 level depending on a direction of the "quick slide." For example, if a current volume is at level 3, a quick slide forward 1952/1954 increases the volume 1904 changing the volume from level 3 to level 4, where 1 represents minimum volume and 8 represents maximum volume. Similarly, a quick slide backward from level 3 results in a decrease in volume 1906 changing the volume thereby from level 3 to level 2.

"Slow slide" applied by a user to the touch slider means increase or decrease the volume continuously. For example, if the current volume is at level 3, a slow slide forward to the end of the touch sensor region increases volume 1904, changing it from level 1 to level 8. A slow slide forward to a middle of the touch sensor region, increases volume 1904, changing the volume from a level 1 to a level 4.

When the volume is at level 4, slow slide backward 1962/1964 to the end of the sensor region, decreases volume 1906, changing the volume from a level 4 to a level 1.

From an incoming phone call state 1920, sliding forward 1952/1954 results in answering an incoming call at 1924. From the incoming phone call state 1920, sliding backward 1962/1964 results in rejection of an incoming call at 1922.

A double tap executed by a user on the touch slider region 1930 of the smart glasses 1940 is used to activate or deactivate the wake-up chip. In one or more embodiments, if voice wake-up is in an "OFF" state then a double tap applied to the touch slider region changes the voice wake-up to an "ON" state 1910. Similarly, if voice wake-up is in an "ON" state 1910, then a double tap applied to the touch slider region changes the voice wake-up to the "OFF" state 1902.

In various embodiments, a single tap is used to play music by moving the system to a music "PLAY" state 1902 or to enter a music "PAUSE" state 1908, where music play is paused pending further input from the user. When in the "PAUSE" state, a subsequent single tap from the user moves control back to the "PLAY" state and music play resumes at

1902. Additional state changes are accomplished by subsequent single taps to move between PLAY" to PAUSE" and vice versa as desired.

Figure 20:
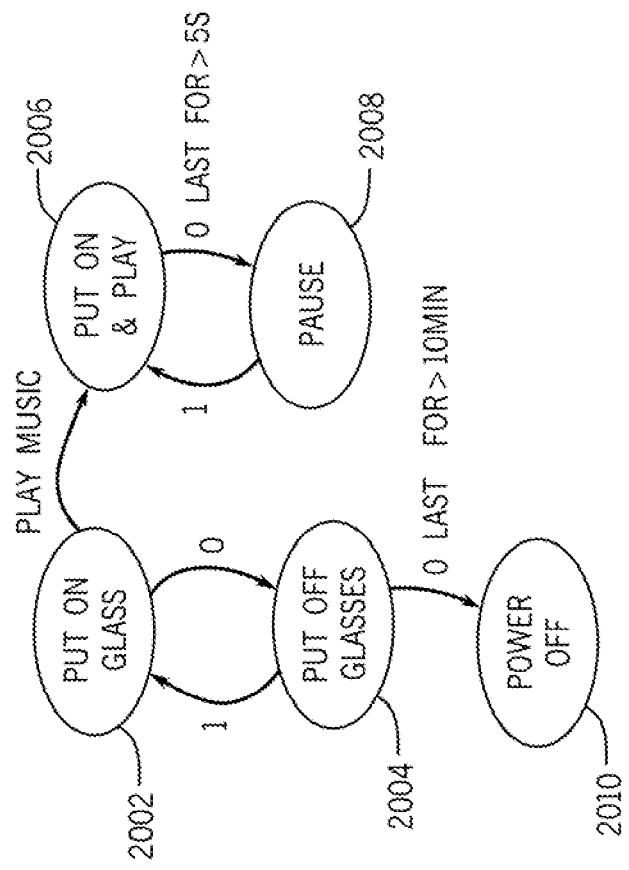
FIG. 20 illustrates a state diagram for proximity sensor operation, according to embodiments of the invention.

FIG. 20 illustrates a state diagram, generally at 2000, for proximity sensor operation, according to embodiments of the invention. In various embodiments, a proximity sensor (such as 1618 in FIG. 16) is used to detect whether a user is wearing the head wearable device or has taken the head wearable device (eyewear) off. In one example, given merely for illustration, and with no limitation implied thereby, the logic for the sensor operation proceeds as follows. If the output of the proximity sensor is a "1" that means that the user is wearing the eyewear 2002. If the output of the proximity sensor is a "0" that means that the user has removed the eyewear 2004.

Logic is configured to turn "OFF" music play when the user removes the eyewear from the user's head. For example, if user has put on the eyewear 2002, then music will "PLAY" at 2006 controlled by either of the sensors described above that control the music play functionality. If the user removes the eyewear 2004, the proximity sensor will output "0," when the "0" output has lasted for more than a predetermined time, the music will "STOP" and the system will enter a "PAUSE" state 2008 for music play. In one or more embodiments, the predetermined time required for the music to stop playing is five (5) seconds. The music will resume "PLAY" state 2006 if the user puts the eyewear back on, in which case the proximity sensor output changes to "1."

If the eyewear should remain off of the user's head for more than a predetermined time, then the system is powered down into an "OFF" state at 2010. In one or more embodiments, the predetermined time required to power the system down while the user is not wearing the eyewear is ten (10) seconds or more. Those of ordinary skill in the art will recognize that the predetermined times given above are examples and that different predetermined times can be used in various embodiments. No limitation is implied by the times selected for the examples given herein.

Figure 21A:
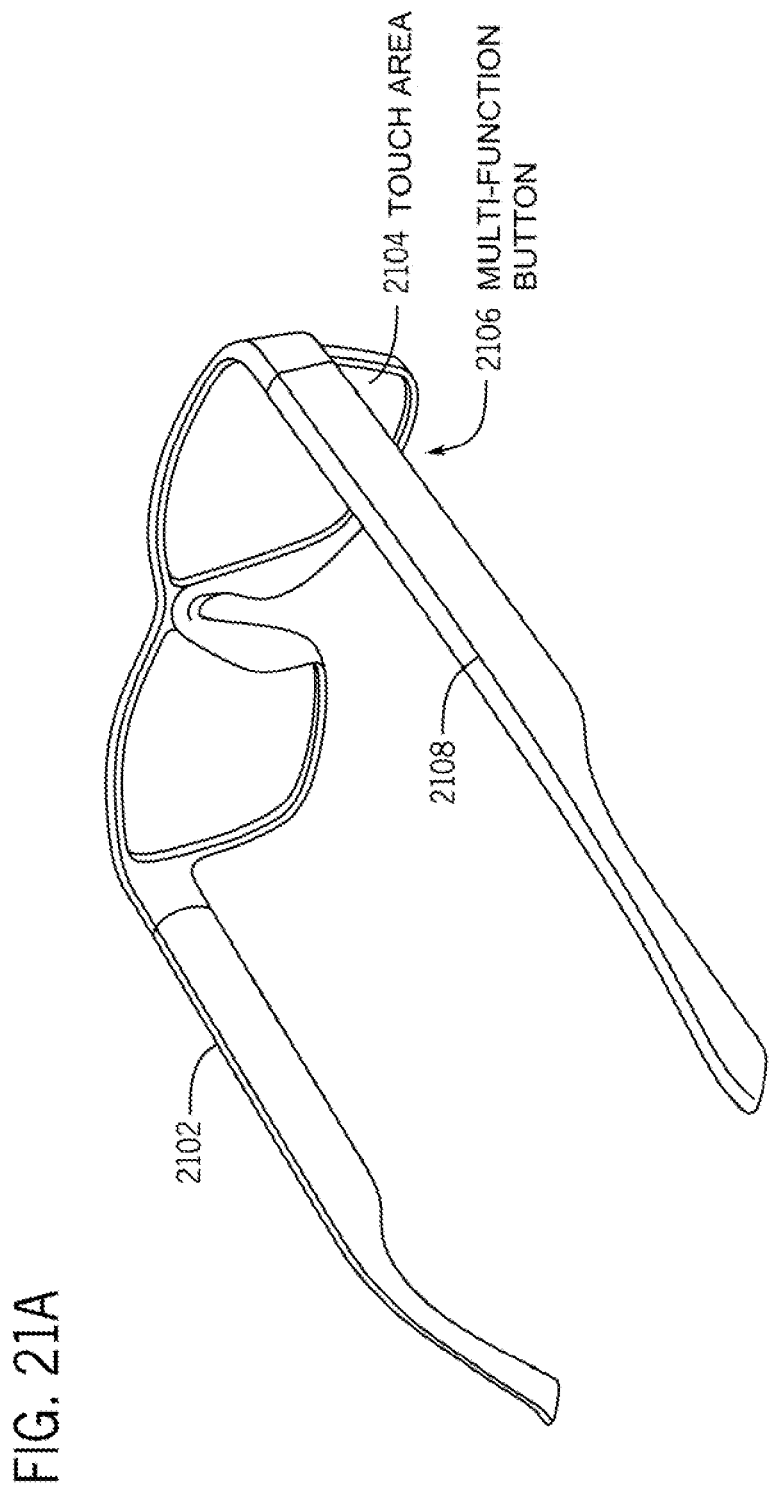
FIGS. 21A-21D illustrate locations of buttons, according to embodiments of the invention.

FIG. 21A through FIG. 21D illustrate locations for the touch sensor and the multi-function button. With reference to FIG. 21A, an eyewear device is illustrated at 2102 in perspective view with rear orientation. A multifunction button 2106 is shown located on an underside of a right temple 2108. A touch sensor area 2104 is shown located on an outer surface of the right temple 2108. Both the multifunction button 2106 and the touch sensor area 2104 provide functionality as described in conjunction with the figures above.

Figure 21B:
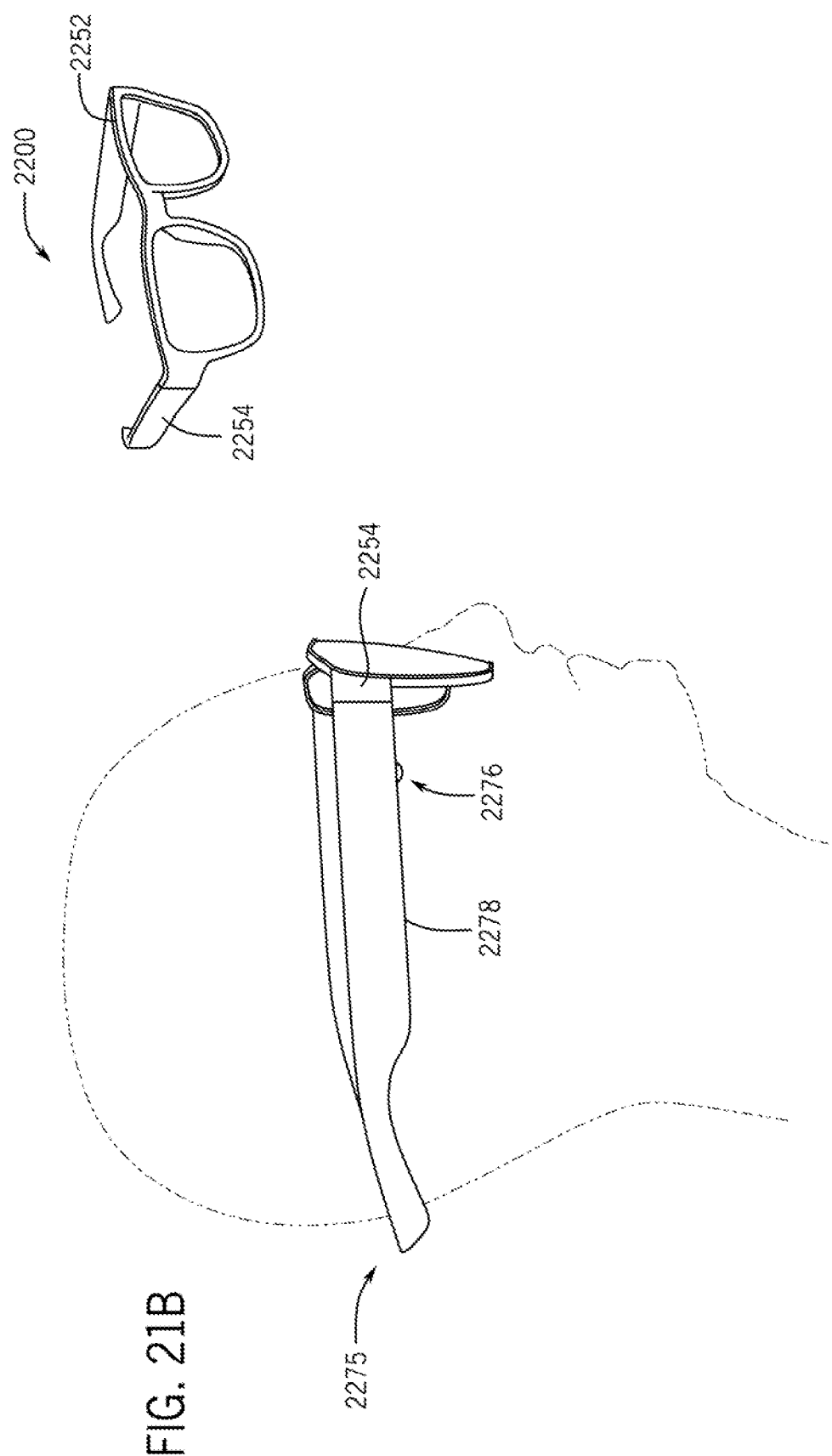

With reference to FIG. 21B, an eyewear device 2252 is illustrated in a forward oriented perspective view at 2200 and in side view at 2275. A multifunction button 2276 is shown located on an underside of a right temple 2278 of the eyewear device 2252. A touch sensor area 2254 is shown located on an outer surface of the right temple 2278. Both the multifunction button 2276 and the touch sensor area 2254 provide functionality as described in conjunction with the figures above.

Figure 21C:
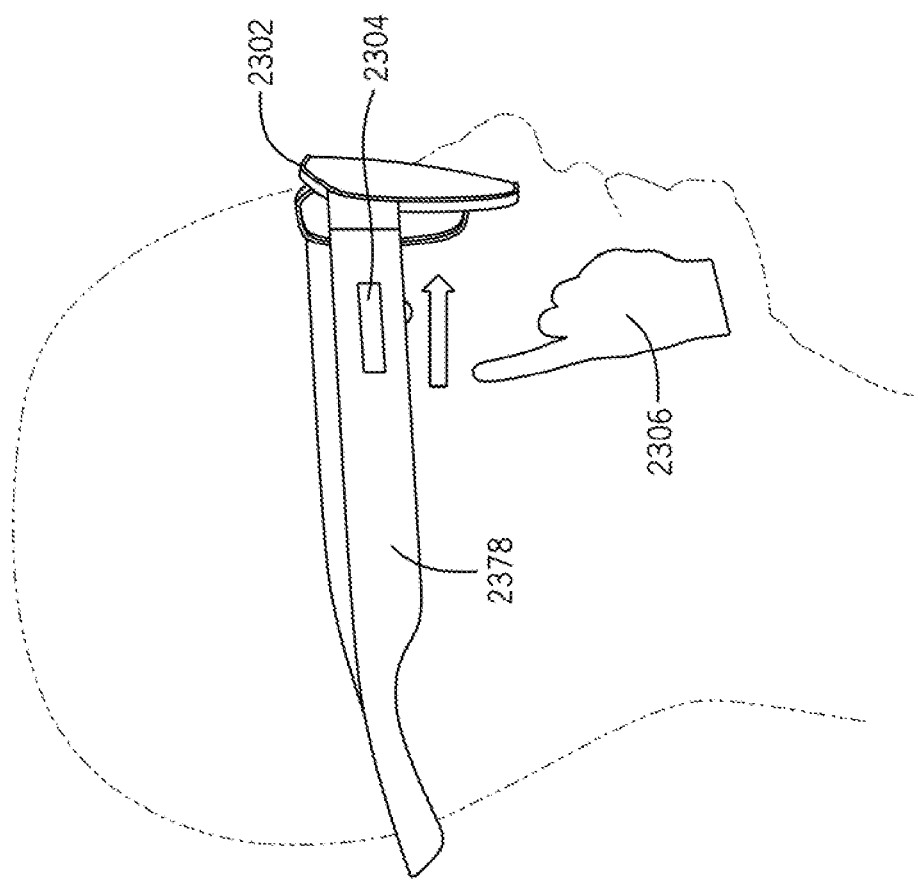

With reference to FIG. 21C, an eyewear device is illustrated in side view at 2300. A touch sensor area 2304 is illustrated as a rectangular area on an outer side of the right temple 2378. Note that the touch sensor area 2304 can be provided in shapes other than rectangular. A rectangular shape for 2304 is provided merely for illustration with no limitation implied thereby. A user utilizes a finger 2306 to slide forward or backward to control volume as described above in conjunction with the preceding figures and to initiate taps as described above.

Figure 21D:
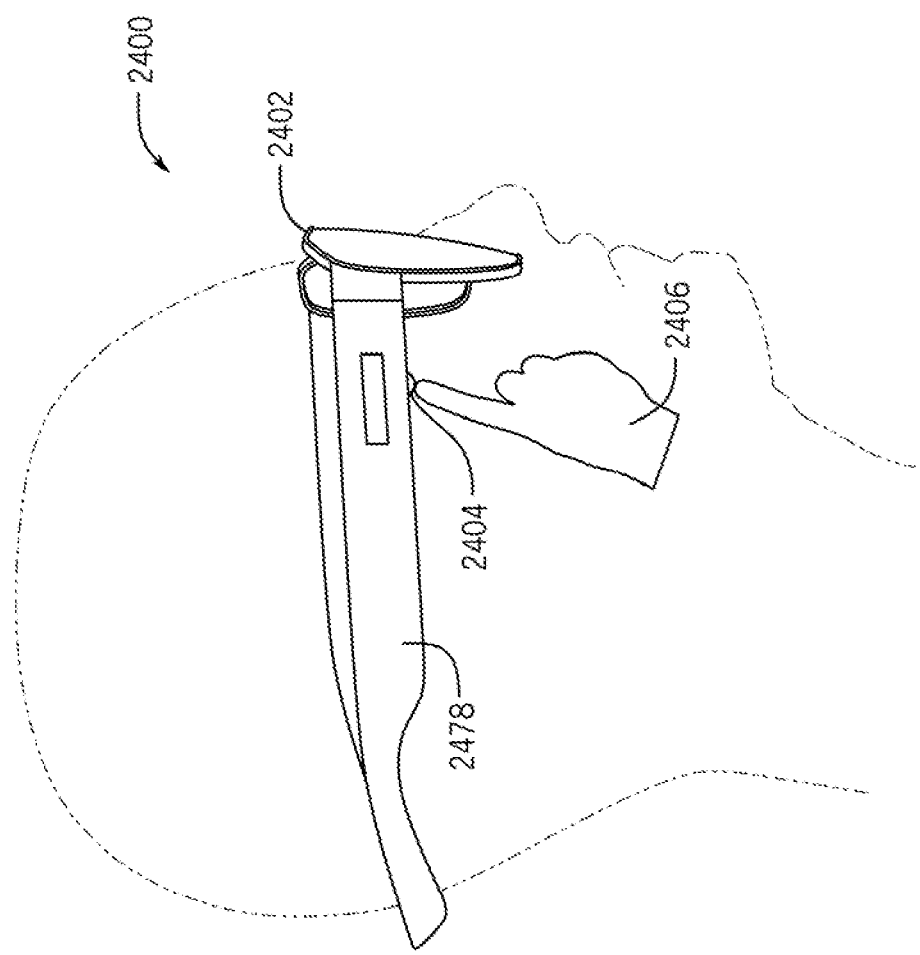

With reference to FIG. 21D, an eyewear device 2402 is illustrated in a side view at 2400. A multifunction button 2404 is illustrated on an under side of a right temple 2478. A user utilizes a finger 2406 to depress the button 2404 as described above in conjunction with the preceding figures in order to control functions of the eyewear system in 2402.

Note that the multi-function button and or the touch sensor area can be located in other positions on the head wearable device, such as, for example, on an outer surface of a temple, on a top surface of a temple, or on a left temple.

For example, in one or more embodiments, a multifunction button is located on a top surface of a right temple. In use, a user grasps the right temple with two fingers, one finger placed on a bottom surface of the temple and the other finger placed against a top surface of the temple. For example, in one scenario, the user places a right thumb against the underside of the right temple, a right middle finger is placed on a top surface of the right temple thereby grasping the right temple. With the right index finger the user can operate the multifunction button. Arranged in this fashion the multifunction button is set back from a plane of the front frame such that the button is aligned with and operable by the user's index finger when the temple as grasped as described above.

In various embodiments, such an arrangement of the multifunction button is more easily operated when the user is undergoing an activity such as bicycle riding and the user is operating the multifunction button.

In some embodiments, a bump, depression, or other shape of alignment mark is fashioned into the temple to serve as an alignment location for a user's finger or fingers relative to a location of the multifunction button. Placing a multifunction button a specified distance from an alignment location permits a user to quickly find the multifunction button when the eyewear is on the user's head. In some embodiments, the alignment is provided when a user grasps a temple with thumb and middle finger at the junction of the temple and the front frame.

While the multifunction button is shown on the right temple, the multifunction button can also be located on a left temple of the eyewear device. A left-handed user might prefer to have the multifunction button as well as the touch sensor located on a left temple, while a right-handed user might prefer to have the multifunction button and the touch sensor located on a right temple. Thus, embodiments of the invention are configured in either button/temple configuration.

Gesture Detection

In various embodiments, the hardware architecture includes a touch sensor and a multi-axis motion sensor as described above. In some embodiments, a nine (9) axis motion sensor is used. The sensor data is used to detect various head gestures. Once a head gesture is detected, a corresponding action will be taken by the system. In one example, when a phone call comes in, a user can nod his or her head in one direction, such as up and down to answer the call. Similarly, a head shake left-to-right or right-to-left is interpreted by the system to reject the call. For example, a phone call comes in, a user can put his or her finger on the touch sensor and then nod his or her head down to pick up the phone call. Or with a finger on the touch sensor, the user shakes his or her head to reject the call.

In some embodiments, the multi-axis sensor is used for posture detection of the user. In various embodiments, the sensors collect accelerometer data, gyroscope data, and magnetometer data and then pass the data to the system for processing using a software algorithm running on a central processing unit (CPU), DSP, etc. as described in conjunction with the figures above In some embodiments, sensors are configured using three orthogonal axes. These data are processed using one or more of; a software algorithm, a CPU, and a DSP to detect the posture of the user's head. In various embodiments, when the user's head is not in a proper position for a long time, a voice message is generated and broadcast via the speaker to the user. Such communications to the user permit the user to take corrective action and improve posture for example.

Audio Content

As described above, in various embodiments, a head wearable device is used in conjunction with a mobile device to facilitate phone calls with the system that is configured into the head wearable device (eyewear device). Content, such as music can be streamed via a mobile device to a head wearable device. The content stream can also originate in the "cloud," i.e., the Internet, or local network and be streamed to the head wearable device. In addition, local storage configured either with the system (FIG. 16) or configured on the head wearable device for use by the system (FIG. 16) can be used to provide a source of content that is played for the user through the speaker(s) incorporated with the head wearable device. Thus, in various embodiments, content is played for a user through the head wearable device either in conjunction with a mobile device or in a standalone configuration without the mobile device.

Answering a Phone Call

Phone calls can be answered in various ways in various embodiments. A phone call can be answered and or terminated with the voice interface utilizing the local speech recognition system using control words such as "ANSWER" to receive a call and "GOODBYE," for example, to end a call. Alternatively, a phone call can be answered with one or more of the physical sensors such as the "touch sensor" and or the "button." Alternatively, a phone call can be answered through analysis of a head gesture utilizing data output from the accelerometers, gyroscope, etc. Note that a combination of one or more of the above (i.e., speech recognition, sensor output, and gesture identification) can be combined to answer a phone call. Similarly, one or more of the above can be combined to provide for selection and or playing of audio content for the user through the system incorporated into the head wearable device.

Command and Control

System control—utilizing a wake-up word to power the system up from a sleep state using a wake-up word, such as for example, "SOLOS". Content control—"play running music," "skip song," "volume up," "volume down," etc. Telephone control—such as for example: "make a phone call to 'name'" (phone number corresponding to 'name' e.g., can be selected from contacts), "volume up," "volume down." Information control—such as for example: "internet browsing," checking for "temperature," check "weather," "navigation," etc. These examples have been provided merely for illustration and do not limit embodiments of the invention.

Magnetometer

In various embodiments, a magnetometer is incorporated into a head wearable device. In some embodiments, the magnetometer is a three-axis magnetometer. The magnetometer in the head wearable device is used for navigation to ascertain an orientation of the user to the earth's magnetic field. A magnetometer mounted in a head wearable device, when on a user, has a fixed pointing direction that is aligned with the movement of the user. Thus, a magnetometer's output from a head wearable device will provide a more useful signal then a magnetometer that might be incorporated into a user's mobile phone because the mobile phone is not necessarily aligned with the direction that the user is pointing in.

In various embodiments, a magnetometer's output is used within an application program utilizing a map to display a user's direction and to rotate the digital map as the user's orientation to north changes, for example.

Accelerometer

In various embodiments, one or more accelerometers are provided in the head wearable device. In some embodiments, a three-axis accelerometer is provided.

Gyroscope

In various embodiments, one or more gyroscopes are provided in the head wearable device. In some embodiments, a three-axis gyroscope is provided.

Battery Housed in One or More Temples

In various embodiments, one or more batteries are provided to power the system and the one or more batteries are stored within a volume of a temple or temples. Batteries are constructed with chemistries such as Lithium Ion or other battery chemistries to support long life and to permit many recharge cycles over the life of the battery. Depending on the expected power needs for a head wearable device, several different sized temples can be provided for different applications. For example, some sports events might require six or more hours of "ON" time for a system. In such a situation, a large temple houses a long-life battery. A smaller volume temple will house a smaller battery having a shorter useful time between recharge cycles. Head wearable devices are configured for various uses such as sporting activities, business uses, home, and commercial uses. Some non-limiting examples of sporting activities are, but are not limited to, bicycling, running, skiing, boating, hiking, etc.

System Distribution Across the Head Wearable Device

In one or more embodiments, the electronics system of a head wearable device is distributed across a left temple, a front frame, and a right temple. In one or more embodiments, a left temple houses a battery, one or more microphones, and at least one speaker. A right temple houses a battery, system electronics, one or microphones, and at least one speaker. In some embodiments, electrical connections between components of the system (temples and front frame) are provided in the form of removable connectors. In some embodiments, these connectors can be hinged.

For purposes of discussing and understanding the different embodiments, it is to be understood that various terms are used by those knowledgeable in the art to describe techniques and approaches. Furthermore, in the description, for purposes of explanation, numerous specific details are set forth in order to provide a thorough understanding of an embodiment. It will be evident, however, to one of ordinary skill in the art that an embodiment may be practiced without these specific details. In some instances, well-known structures and devices are shown in block diagram form, rather than in detail, in order to avoid obscuring various embodiments. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory.

These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), dynamic random access memories (DRAM), electrically programmable read-only memories (EPROM)s, electrically erasable programmable read-only memories (EEPROMs), FLASH memories, magnetic or optical cards, RAID, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the embodiments can be implemented in hard-wired circuitry, by programming a general-purpose processor, or by any combination of hardware and software. One of ordinary skill in the art will immediately appreciate that the embodiments can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The embodiments can also be practiced in distributed computing environments where tasks are performed by remote processing devices that are linked through a communications network.

The methods herein may be implemented using computer software. If written in a programming language conforming to a recognized standard, sequences of instructions designed to implement the methods can be compiled for execution on a variety of hardware platforms and for interface to a variety of operating systems. In addition, the embodiments are not described with reference to any particular programming language. It will be appreciated that a variety of programming languages may be used to implement the teachings of the embodiments as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical representation in at least hardware and/or software (such as a computer system in which the techniques of the present invention may be practiced as well as implemented as an embodiment).

Non-transitory machine-readable media is understood to include any mechanism for storing information (such as program code, etc.) in a term readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A reconfigurable component for use in an eyewear device, comprising:
    at least one temple insert module (TIM) removably attached to at least one temple of the eyewear device through an engagement portion of the at least one temple, wherein the at least one temple comprises a plurality of electrical pathways and the engagement portion comprises a magnetic surface; and an electronics package electronically connected to the at least one TIM through the plurality of electrical pathways, wherein the electronics package comprises:
at least a processor;
a plurality of sensors; and
a memory communicatively connected to the at least a processor, wherein the memory contains instructions configuring the at least a processor to:
receive a plurality of outputs from the plurality of sensors; and
determine a system control parameter as a function of at least an output of at least one sensor of the plurality of sensors.

2. The reconfigurable component of claim 1, wherein the plurality of sensors further comprises:
at least one accelerometer configured to measure acceleration along three mutually orthogonal axes X, Y, and Z;
at least one gyroscope configured for gyroscope output along three mutually orthogonal axes X, Y, and Z; and
at least one magnetometer configured for magnetometer output along three mutually orthogonal axes X, Y, and Z.

3. The reconfigurable component of claim 1, further comprising:
a multifunction button, wherein the processor is configured to:
receive signals from the multifunction button;
determine a length of time that the multifunction button is depressed by a user; and
initiate one or more system actions selected from a group consisting of pair a mobile device, unpair the mobile device, play content, select a next song, make a telephone call, answer a telephone call, and reject the telephone call based on the length of time.

4. The reconfigurable component of claim 2, wherein the processor is configured to:
detect a head gesture as the system control parameter based on the measure acceleration, the gyroscope output, and the magnetometer output along the three mutually orthogonal axes X, Y, and Z.

5. The reconfigurable component of claim 3, wherein the plurality of sensors comprises a touch sensor communicatively connected to the multifunction button.

6. The reconfigurable component of claim 1, wherein the at least one TIM comprises an embedded electronics system configured to wirelessly communicate with an external device.

7. The reconfigurable component of claim 6, wherein the processor is configured to:
receive audio signals from a microphone of the plurality of sensors;
facilitate an operation of wireless voice communication when a command is recognized using an embedded speech recognition system; and
move the embedded electronic system to a RUN state when a wake-up word is detected during the operation.

8. The reconfigurable component of claim 6, wherein the processor is configured to:
receive an output from a proximity sensor of the plurality of sensors, wherein the output comprises a measured distance between the at least one TIM and the external device; and
determine a user interaction state as the system control parameter based on the received output, wherein the user interaction state comprises an open state and a closed state.

9. The reconfigurable component of claim 6, wherein the user interaction state is used to control music play.

10. A method to provide information to a user through an eyewear device, comprising:
receiving a plurality of outputs from a plurality of sensors, by at least one processor, the processor is contained within an electronics package electronically connected to at least one temple insert module (TIM) removably attached to at least one temple of the eyewear device having a plurality of electrical pathways through an engagement portion of the at least one temple using the plurality of electrical pathways, wherein the engagement portion comprises a magnetic surface;
determining, by the at least one processor a system control parameter using at least one output of the plurality of outputs from the plurality of sensors; and
controlling at least one function of the eyewear device with the system control parameter.

11. The method of claim 10, wherein at least one sensor of the plurality of sensors is a button and the processor is configured to associate a length of time that a user depresses the button with a system action, wherein the system action is selected from a group consisting of pairing with a mobile device, unpairing from the mobile device, playing content, selecting a next song, making a telephone call, answering the telephone call, and rejecting the telephone call.

12. The method of claim 10, wherein receiving the plurality of outputs comprises:
receiving a measure acceleration along three mutually orthogonal axes X, Y, and Z from at least one accelerometer of the plurality of sensors;
receiving a gyroscope output along three mutually orthogonal axes X, Y, and Z from at least one gyroscope; and
receiving a magnetometer output along three mutually orthogonal axes X, Y, and Z from at least one magnetometer.

13. The method of claim 12, wherein the method comprises:
Detecting, by the at least one processor, a head gesture as the system control parameter based on the measure acceleration, the gyroscope output, and the magnetometer output along the three mutually orthogonal axes X, Y, and Z.

14. The method of claim 11, wherein the plurality of sensors comprises a touch sensor communicatively connected to the button.

15. The method of claim 10, wherein the at least one TIM comprises an embedded electronics system configured to wirelessly communicate with an external device.

16. The method of claim 15, wherein the method comprises:
receiving, by the at least one processor, audio signals from a microphone of the plurality of sensors;
facilitating, by the at least one processor, an operation of wireless voice communication when a command is recognized using an embedded speech recognition system; and
moving, by the at least one processor, the embedded electronic system to a RUN state when a wake-up word is detected during the operation.

17. The method of claim 15, wherein the method comprises:
   receiving, by at least one processor, an output from a proximity sensor of the plurality of sensors, wherein the output comprises a measured distance between the at least one TIM and the external device; and
   determining, by at least one processor, a user interaction state as the system control parameter based on the received output, wherein the user interaction state comprises an open state and a closed state.

18. The method of claim 17, wherein controlling at least one function of the eyewear device comprises controlling a music play using the user interaction state.

\* \* \* \* \*